(12) United States Patent
Petite et al.

(10) Patent No.: US 8,193,930 B2
(45) Date of Patent: Jun. 5, 2012

(54) SYSTEMS AND METHODS FOR REMOTE IRRIGATION CONTROL

(75) Inventors: Thomas David Petite, Atlanta, GA (US); Richard M Huff, Conyers, GA (US)

(73) Assignee: SIPCO, LLC, Atlanta, GA (US)

( * ) Notice: Subject to any disclaimer, the term of this patent is extended or adjusted under 35 U.S.C. 154(b) by 0 days.

(21) Appl. No.: 13/225,110

(22) Filed: Sep. 2, 2011

(65) Prior Publication Data

US 2011/0320050 A1   Dec. 29, 2011

Related U.S. Application Data

(63) Continuation of application No. 12/477,329, filed on Jun. 3, 2009, now Pat. No. 8,013,732, which is a continuation of application No. 12/337,739, filed on Dec. 18, 2008, now Pat. No. 7,978,059, which is a continuation of application No. 11/395,685, filed on Mar. 31, 2006, now Pat. No. 7,468,661, which is a continuation of application No. 10/139,492, filed on May 6, 2002, now Pat. No. 7,053,767, which is a continuation of application No. 09/439,059, filed on Nov. 12, 1999, now Pat. No. 6,437,692, which is a continuation-in-part of application No. 09/271,517, filed on Mar. 18, 1999, now abandoned, and a continuation-in-part of application No. 09/102,178, filed on Jun. 22, 1998, now Pat. No. 6,430,268, and a continuation-in-part of application No. 09/412,895, filed on Oct. 5, 1999, now Pat. No. 6,218,953, and a continuation-in-part of application No. 09/172,554, filed on Oct. 14, 1998, now Pat. No. 6,028,522.

(60) Provisional application No. 60/146,817, filed on Aug. 2, 1999.

(51) Int. Cl.
*G08B 1/08* (2006.01)

(52) U.S. Cl. ............... 340/539.1; 340/531; 700/284; 239/63

(58) Field of Classification Search ............ 340/539.1, 340/531, 601, 4.3, 4.34; 700/19, 284; 239/63, 239/68, 69; 137/624.12
See application file for complete search history.

(56) References Cited

U.S. PATENT DOCUMENTS 5,740,031 A * 4/1998 Gagnon .................. 700/16

(Continued)

OTHER PUBLICATIONS

AES IntelliNet Model 7050-E & 7750-E, RF Subscriber Unit, Version 1.71, Installation & Operation Manual, AES IntelliNet, Author: unknown, Feb. 24, 1997, available at www.guardianalarms.net, pp. 1-54.

(Continued)

*Primary Examiner* — Toan N Pham
(74) *Attorney, Agent, or Firm* — Trenton A. Ward, Esq.; Dustin B. Weeks, Esq.; Troutman Sanders LLP

(57) ABSTRACT

Embodiments of the present invention are generally directed to systems and methods for remote irrigation control. An exemplary embodiment of the present invention provides a remote irrigation control system having a rain sensor enabled to detect the amount of rain received in a first rain area, and a first local transceiver in communication with the rain sensor, the first local transceiver configured to receive information from the rain sensor and transmit the information to a gateway, the first local transceiver also configured to receive information from the gateway. The gateway is connected to a wide area network and configured to receive information from the first local transceiver and transmit the information to the wide area network, the gateway also configured to receive information from the wide area network and transmit the information to the first local transceiver. Other aspects, features, and embodiments are also claimed and described.

20 Claims, 18 Drawing Sheets

U.S. PATENT DOCUMENTS

| | | | | |
|---|---|---|---|---|
| 6,823,239 | B2* | 11/2004 | Sieminski | 700/284 |
| 7,899,580 | B2* | 3/2011 | Cardinal et al. | 700/284 |
| 7,930,069 | B2* | 4/2011 | Savelle et al. | 700/284 |
| 7,949,433 | B2* | 5/2011 | Hern et al. | 700/284 |

OTHER PUBLICATIONS

AES IntelliNet Model 7050-E Radio Subscriber Unit Installation Manual, AES IntelliNet, Author: unknown, Jul. 17, 2000, available at www.guardianalarms.net, pp. 1-4.

AES IntelliNet Model 7440 & 7440-XL RF Subscriber Unit, Addendum, AES IntelliNet, Author: unknown, Aug. 29, 2002.

AES IntelliNet Net 77 Version 1.48.30, Installation & Operation Manual, Document 40-0551u, AES Corporation, Author: unknown, Jun. 1999, pp. 1-30.

AES IntelliNet Net 77 Version 1.48.4, Installation & Operation Manual, Document 40-0551u, AES Corporation, Author: unknown, Nov. 2000, pp. 1-36.

AES IntelliNet Net 7K Version 1.48.4, Installation & Operation Manual, Document 40-0551, AES Corporation, Nov. 2000, pp. 1-36.

AES IntelliNet Net7K Version 3, Installation & Operation Manual, Document 40-0551, AES Corporation, Jun. 1999, pp. 1-30.

AES IntelliNet Radio Communication Subscriber Unit 7050, Sep. 16, 1997, available at http://web.archive.org/web/19990203061203/www.aes-intellinet.com/sp on Mar. 5, 2009, pp. 1-2.

AES IntelliNet Theory of Operation, AES IntelliNet; Author: unknown, Dec. 1996, downloaded from http://www.guardianalarms.net, pp. 1-18.

AES IntelliNet Wireless Network Glossary of Terms, document 40-0551u, AES IntelliNet, Author: unknown, Dec. 1996, pp. 1-15.

AES IntelliNotes Universal Serial data Interface/USDI, Bulletin No. 55, AES Corporation, Author: unknown, Apr. 5, 2001, pp. 1-12.

AES IntelliTAP Model 7068, Version 1.08, Installation Guide, AES IntelliNet, Author: unknown, Jun. 15, 2000, pp. 1-11.

AES IntelliTRAK 7555-RT GPS Based Vehicle Tracking Unit, Version 2.0a, AES IntelliNet, Author: unknown, Feb. 20, 2001, pp. 1-16.

AES IntelliTRAK 7555-RT GPS Based Vehicle Tracking Unit, Version 2.12, AES IntelliNet, Author: unknown, Nov. 6, 2002, pp. 1-16.

AES Net7000, Installation & Operation Manual, AES Intellinet, Author: unknown, Nov. 24, 1996, pp. 1-76.

AES Net77 Wireless Network Management Software Installation & Operation ManuCentral Station Manual, Section 3, AES IntelliNet, Author: unknown, Dec. 1996, pp. 1-87.

AES UL/ULC System Configuration, AES Corporation, Author: unknown, May 1, 2003, pp. 1.

Agre et al., "Autoconfigurable Distributed Control Systems," ISADS, Apr. 27, 1995.

Airpath Wireless, Inc., "Hot Spot Hardware," Copyright 2003, http://www.airpath.com/programs/hardward/hardware.htm (vistited Jul. 29, 2003) (2 pages).

AlarmLink, Inc. A Brief History available at http://www.alarmlink.com/Default.aspx?tabid=28, on Mar. 23, 2009, pp. 1.

AlarmLink, Inc. Alarm Over IP Products, available at http://www.alarmlink.com/Default.aspx?tabid=38 on Mar. 24, 2009, pp. 1.

AlarmLink, Inc. Central Stations, availabe at http://www.alarmlink.com/Default.aspx?tabid=35, on Mar. 24, 2009.

AlarmLink, Inc. Home Page, avaliable at http://www.alarmlink.com/ on Mar. 24, 2009, pp. 1.

AlarmLink, Inc., "MeshWorks of Los Angeles," available at http://www.alarmlink.com/Default.aspx?tabid=39 on Mar. 24, 2009, pp. 1.

Alwan et al., "Adaptive Mobile Multimedia Networks," IEEE Personal Communications, Apr. 1996, pp. 34-51.

Amir et al., "An Evaluation of the Metricom Ricochet Wireless Network," CS 294-7 Class Project, Department of Electrical Engineering and Computer Science of the University of California at Berkeley, Publisher: unknown, May 7, 1996, pp. 1-20.

Amir, "The Ricochet System Architecture," available at http://www.lariat.org/Berkeley/node2.html, on May 1996, pp. 1-5.

Asada et al., "Low Power Wireless Communication and Signal Processing Circuits for Distributed Microsensors;" Proceedings of the International Circuits and Systems Symposium, ISCAS '97; UCLA, Rockwell Science Center; Jun. 1997, pp. 1-5.

Asada, "Wireless Integrated Network Sensors (WINS)," UCLA, SPIE vol. 3673, Mar., 1999, pp. 11-18.

Baba et al., "Wireless Medium Access Control Protocol for CAN," 4th Int'l CAN Conf., Berlin, Germany, available at http://www.can-cia.org/fileadmin/cia/files/icc/4/baba 1.pdf (1997).

Baker et al. "The Architectual Organization of a Mobile Radio Network via a Distributed Algorithm," IEEE, Nov. 1981.

Ball et al., "Reliability of Packet Switching Broadcast Radio Networks," IEEE Transactions on Circuits and Systems, vol. CAS-23, No. 12, Dec. 1976, pp. 806-813.

Beech et al., "AX.25 Link Access Protocol for Amateur Packet Radio, Version 2.2," American Relay & Tucson Amateur Packet Radio Corporation, Jul. 1993, Revised Jul. 1998, pp. 1-143.

Bergstein, "US telco plans WiFi payphone," May 12, 2003, http://www.news.com.au/common/story_page/0,4057,6420676%5E15306,00.html (2 pages).

Bhatnagar et al., "Layer Net: A New Self-Organizing Network Protocol," Department of Electrical Engineering, SUNY, IEEE, 1990.

Black, "Lutron RF Technology, Reliable, First, Forward Thinking," Lutron Electronics Co. Inc., Aug. 2006, pp. 1-16.

Blaney, "HomeRF™ Working Group, 4th Liason Report," IEEE, 802.11-98/360, Nov. 1998, Slides 1-12.

Brain, "How Motes Work," available at http://computer.howstuffworks.com/mote.htm, on Feb. 25, 2010, pp. 1-2.

Brain, "How Motes Work: Ad hoc Networks," available at http://computer.howstuffw orks.com/mote3.htm on Feb. 25, 2010, pp. 1-3.

Brain, "How Motes Work: The Basic Idea," available at http://computer.howstuff works.com/mote1.htm, on Feb. 25, 2010, pp. 1-2.

Brain, "How Motes Work: Typical Applications," available at http://computer.howstuff works.com/mote2.htm, on Feb. 25, 2010, pp. 1-2.

Brayer, "Implementation and Performance of Survivable Computer Communication with Autonomous Decentralized Control," IEEE Communications Magazine, Jul. 1983, pp. 34-41.

Brownrigg et al., "Development of a Packet-Switching Network for Library Automation," Proceedings of the National Online Meeting Apr. 12-14, 1983, pp. 67-74.

Brownrigg et al., "Distributions, Networks, and Networking: Options for Dissemination," Workshop on Electronic Texts, Session III, available at http://palimpsest.standford.edu/byorg/lc/etextw/sess3.html, Jul. 17, 2007, pp. 1-10.

Brownrigg et al., "Electrons, Electronic Publishing, and Electronic Display," Information Technology and Libraries (Sep. 1985), pp. 201-207.

Brownrigg et al., "Implementing Library Automation Plans in a University Computing Environment, Planning for Computing in Higher Education 5," EDUCOM Series in Computing and Telecommunications in Higher Education, 1980, pp. 215-225.

Brownrigg et al., "Online Catalogues: Through a Glass Darkly," Information Technology and Libraries, Mar. 1983, pp. 104-115.

Brownrigg et al., "Packet Radio for Library Automation," Information Technology and Libraries 3 (Sep. 1984), pp. 229-244.

Brownrigg et al., "Packet Switching and Library Automation: A Management Perspective," Proceedings of the 45th ASIS Annual Meeting Oct. 17-21, 1982, vol. 19, pp. 54-57.

Brownrigg et al., "Technical Services in the Age of Electronic Publishing," Library Resource & Technical Services, Jan./Mar. 1984, pp. 59-67.

Brownrigg et al., "User Provided Access to the Internet," available at http://web.simmons.edu/~chen/nit/NIT'92/033-bro.htm, Jun. 9, 2005, pp. 1-6.

Brownrigg, "Continuing Development of California State Radio Packet Project," Proceedings of the ASIS 1992 Mid-Year Meeting (Silver Spring, MD: American Society for Information Science, 1992), pp. 97-100.

Brunninga, "A Worldwide Packet Radio Network," Signal, vol. 42, No. 10, Jun. 1988, pp. 221-230.

Bult et al. Low Power Systems for Wireless Microsensors, UCLA Electrical Engineering Department, 1996 ISLPED, pp. 1-5.

Bult et al., "A Distributed, Wireless MEMS Technology for Condition Based Maintenance," EED, Defense Technical Information Center, UCLA, Electrical Engineering Department, Rockwell Science Center; Apr. 22-26, 1996.

Bult et al., "A Distributed, Wireless MEMS Technology for Condition Based Maintenance," Publisher: unknown; Nov. 1997, pp. 1-8.
Bult et al., "Low Power Systems for Wireless Microsensors," EED, UCLA; ILSPED; 1996, pp. 1-15.
Bult et al., "Low Power Systems for Wireless Microsensors," UCLA Electrical Engineering Department, Los Anegeles, CA and Rockwell Science Center, Thousand Oaks, CA; Aug. 14, 1996, pp. 25-29.
Bult et al., "Low Power Wireless Integrated Microsensors (LWIM)," EED, UCLA; ARPA—LPE PI Meeting, Apr. 27-28, 1995, pp. 1-30.
Bult et al., "Wireless Integrated Microsensors," EED, UCLA Electrical Engineering Department, Rockwell Science Center, TRF; Jun. 6, 1996, pp. 205-210.
Caddx-Caddi Controls, Inc., Ranger 9000E, User's Manual, downloaded from http://www.guardianalarms.net, May 17, 1996, pp. 1-9.
Carlisle, "Edison's NetComm Project," Proceedings of the 33rd Annual Rural Electric Power Conference, IEEE, Apr. 1989, pp. B5/1-B5/4.
Chen et al., "Route Optimization and Location Updates for Mobile Hosts,"1996 IEEE, Proceedings of the 16th ICDCS, pp. 319-326.
Cisco Systems, Inc., Enhanced Interior Gateway Routing Protocol, Cisco Systems, Inc., Updated Sep. 9, 2005, pp. 1-44.
Cisco Systems, RFC1812-Requirements for IP Version 4 Routers, Fred Baker ed. (Jun. 1995), available at http://www.faqs.org/rfcs/rfc1812.html, Sep. 14, 2009, pp. 1-129.
Clement, "SCADA System Using Packet Radios Helps to Lower Cincinnati's Telemetry Costs," Water/ Engineering & Management, Aug. 1996, pp. 18-20.
Cleveland, "Performance and Design Considerations for Mobile Mesh Networks," Milcom '96 Conference Proceedings, vol. 1 of 3, Oct. 22-24, 1996, pp. 245-249.
Clever Solutions—Metricom offers wireless data networks—includes related articles on Metricom's technology and the SONeTech company—Company Profile, available at http://findarticles.com/p/articles/mi_m0REL/is_n. 11_v93/ai_147 70465/?tag=content;col1, on Nov. 22, 1993 (3 pages).
Coactive Networks, Inc., A New Solution for Offering Multive Telemetry Services to the Home, Coactive, 1999, pp. 1-8.
Coactive Networks, Inc., Coactive Connector® 1000 Series, Coactive, 2000, pp. 1-4.
Coactive Networks, Inc., Corporate Backgrounder, Coactive, 2001, pp. 1-6.
Coactive Networks, Inc., Corporate Fact Sheet, Coactive, 2001, pp. 2.
Coactive Networks, Inc., Router-LE: Remote Access to LonWorks Over Ethernet, Coactive, 1998, pp. 1-4.
Coactive Networks, Inc., Router-LL: Connect LonWorks Networks Across Internet Protocol, Coactive, 1998, pp. 1-4.
Cohen et al., "IP Addressing and Routing in a Local Wireless Network," 1992 IEEE, 1992, pp. 626-632.
Corbell et al., "Technical Implementation in Support Of The IAEA's Remote Monitoring Field Trial At The Oak Ridge Y-12 Plant," Dept. of Energy, Office of Scientific and Technical Information, Report No. SAND—096-1934C, available at http://www.osti.gov/bridge/product.biblio.jsp?query_id=1&page=0&osti_id=270678 (1996).
Corbell et al., "Technical Results Of Y-12/IAEA Field Trial of Remote Monitoring System," Dept. Of Energy, Office of Scientific and Technical Information, Report No. SAND—97-1781C, available at http://www.osti.go v/bridge/product.biblio.jsp?query_id=0&page=0&osti_id=505711 (1997).
Corcoran et al., "Browser-Style Interfaces to a Home Automation Network," IEEE Transactions on Consumer Electronics, vol. 43, No. 4, Nov. 1997, pp. 1063-1069.
Corcoran et al., "CEBus Network Access via the World-Wide-Web," available at http://ieeexplore.ieee.org/xpl/freeabs_all.jsp?arnumber= 517285, on Mar. 29, 2009, Paper published on Consumer Electronics, 1996, Digest of Technical Papers, pp. 236-237.
Corcoran et al., "CEBus Network Access via the World-Wide-Web," IEEE, 1996.
Corson et al., "Architectural Considerations for Mobile Mesh Networking," Milcom '96 Conference Proceedings vol. 1 of 3, Oct. 22-24, 1996, pp. 225-229.
Corson et al., "Internet-Based Mobile Ad Hoc Networking," IEEE Internet Computing, Jul.-Aug. 1999, pp. 63-70.

Court's claim construction Order dated Feb. 10, 2009, in *SIPCO LLC et al.* v. *The Toro Co. et al.*, Case No. 2:08-cv-00505-TJS (E.D. Pa.).
Custom Solutions, Inc. Acessories, available at http://web.archive.org/web/19981206221844/www.csi3.com/hv_pv4.htm on Feb. 27, 2009, pp. 1-3.
Custom Solutions, Inc., HomAtion 2000 for HomeVision, Press Release, available at http://web.archive.org/web/19981207075734/www.csi3.com/HV_PR 0 on Feb. 27, 2009, pp. 1-2.
Custom Solutions, Inc., HomeVision 2.7e, Owner's Manual (1999); pp. 1-596.
Custom Solutions, Inc., HomeVision Description, available at http://web.archive.org/web/19981206004955/http://www.csi3.com/HV.htm on Mar. 2, 2009, pp. 1-14.
Custom Solutions, Inc., HomeVision-PC Description, available at http://web.archive.org/web/19981205094024/http://www.csi3.com/hv_pc.htm on Mar. 2, 2009, pp. 1-6.
Custom Solutions, Inc., HomeVision-PC Software, available at http://web.archive.org/web/19990224053817/http://www.csi3.com/hvp3pc.htm on Feb. 27, 2009, pp. 1-2.
Reexamination Control No.90-008011 Non-Final Office Action dated Nov. 19, 2007.
Reexamination Control No. 90-008011 Final Action dated Aug. 13, 2008.
Reexamination Control No. 90-01301 Non-Final Office Action dated Dec. 2, 2009.
Reexamination Control No. 90-010505 Non-Final Office Action dated Mar. 3, 2010.
Reexamination Control No. 90-010507 Non-Final Office Action Mar. 3, 2010.
Reexamination Control No. 90-010508 Non-Final Office Action dated Mar. 3, 2010.
Reexamination Control No. 90-010509 Non-Final Office Action dated Mar. 3, 2010.
Reexamination Control No. 90-010505 Final Office Action dated Aug. 2, 2010.
Reexamination Control No. 90-010507 Final Office Action dated Aug. 2, 2010.
Reexamination Control No. 90-010508 Final Office Action dated Aug. 2, 2010.
Reexamination Control No. 90-010509 Final Office Action dated Aug. 2, 2010.
Reexamination Control No. 90-010510 Final Office Action dated Aug. 20, 2010.
Reexamination Control No. 90-010511 Final Office Action dated Aug. 20, 2010.
Reexamination Control No. 90-010512 Final Office Action dated Aug. 20, 2010.
Reexamination Control No. 90-010301 Final Office Action dated Nov. 5, 2010.
Reexamination Control No. 90-010510 Final Office Action dated Nov. 5, 2010.
Reexamination Control No. 90-010511 Final Office Action dated Nov. 5, 2010.
Reexamination Control No. 90-010512 Final Office Action dated Nov. 5, 2010.
Reexamination Control No. 90-010510 Non-Final Office Action dated Dec. 2, 2009.
Reexamination Control No. 90-010511 Non-Final Office Action dated Dec. 2, 2009.
Reexamination Control No. 90-010512 Non-Final Office Action dated Dec. 2, 2009.
Reexamination Control No. 90-010301 Notice of Intent to Issue Reexam Certificate dated Dec. 13, 2010.
Rehkter et al., "A Border Gateway Protocol 4 (BGP-4)," RFC 1771, (Mar. 1995), available at http://tools.ietf.org/html.rfc1771, Jun. 24, 2009, pp. 1-58.
Reuters, "Verizon Launches Wi-Fi Hot Spots," May 18, 2003, http://www.wired.com/news/wireless/0,1382,58830,00.html (2 pages).
Ritter et al., The Architecture of Metricom's Microcellular Data Network™(MCDN) and Details of its Implementation as the Second and Third Generation Ricochet™ Wide-Area Mobile Data Service, IEEE, 2001, pp. 143-152.

Ross et al., "PNC/DOE Remote Monitoring Project at Japan's Joyo Facility," Office of Scientific and Technical Information, Report No. SAND-96-1937C, available at http://www.osti.gov/bridge/product.bib lio.jsp?query_id=0&pa ge=0&osti_id=270680 (1996).

Saffo, Paul, "Sensors: The Next Wave of Infotech Innovation," Institute for the Future (1997).

Salkintzisa et al., "Design and implementation of a low-cost wireless network for remote control and monitoring applications," Elsevier, Microprocessors and Microsystems, 1997, pp. 79-88.

Saltzer et al., "Source Routing for Campus-wide Internet Transport (Sep. 15, 1980)," available at http://groups.csail.mit.edu/ana/publications/pubPDFs/Sourcerouting.html, Sept. 21, 2009, pp. 1-14.

Schneider et al., "International Remote Monitoring Project Argentina Nuclear Power Station Spent Fuel Transfer Remote Monitoring System," Dept. of Energy, Office of Scientific and Technical Information, Report No. SAND—97-1784C, available at http://www.osti.gov/bridge/product.bibli o.jsp?query_id=1&page=0&osti_id=505674 (1997).

Schulman et al., "SINCGARS Internet Controller-Heart of the Digitized Battlefield," Proceedings of the 1996 Tactical Communications Conference, Apr. 30-May 2, 1996, pp. 417-421.

Shacham et al., "A Packet Radio Network for Library Automation," 1987 IEEE Military Communications Conference, vol. 2, at 21.3.1 (Oct. 1987); pp. 456-462.

Shacham et al., "Dynamic Routing for Real-Time Data Transport in Packet Radio Networks," IEEE Proceedings of INFOCOM '82, pp. 152-159.

Shacham et al., "Future Directions in Packet Radio Architectures And Protocols," Proceedings of The IEEE, vol. 75, No. 1, Jan. 1987, pp. 83-99.

Shacham et al., "Future Directions in Packet Radio Technology," Proceedings of IEEE Infocom 85, Mar. 26-28, 1985, pp. 93-98.

Shacham et al., "Packet Radio Networking," Telecommunications vol. 20, No. 9, Sep. 1986, pp. 42,43,46,48,64 and 82.

Shoch, "Inter-Network Naming, Addressing and Routing, Internet Experiment Note # 19, Notebook section 2.3.3.5," Xerox Palo Alto Research Center, Jan. 29, 1978, Publisher: unknown, pp. 1-9.

Sohrabi et al., Protocols for Self-Organization of a Wireless Sensor Network, IEEE Personal Communications, Oct. 2000, pp. 16-27.

Stern, "Verizon to Offer Wireless Web Link Via Pay Phones," May 10, 2003, http://www.washingtonpopst.com/ac2/wp-dyn?pagename=article&node=&contentID=A367 . . . (3 pages).

Subramanian et al., An Architectural for Building Self-Configurable Systems, IEEE, 2000, pp. 63-73.

Sunshine, "Addressing Problems in Multi-Network Systems," (Apr. 1981), available at ftp://ftp.isi.edu/in-notes/ien/ien178.txt, Sep. 14, 2009, pp. 1-26.

Sunshine, "Addressing Problems in Multi-Network Systems," Proceedings INFOCOM '82, 1982 IEEE, pp. 12-19.

Sunshine, "Network Interconnection and Gateways," IEEE Journal on Selected Areas in Communications, vol. 8, No. 1, Jan. 1990, pp. 4-11.

Sunshine, "Source Routing in Computer Networks," Information Sciences Department of the Rand Corporation (1977), Publisher: unknown, pp. 29-33.

Sutherland, Ed, "Payphones: The Next Hotspot Wave?," Jan. 28 2003, http://www.isp-planet.com/fixed wireless/news/2003/bellcanada_030128.html (3 pages).

Tanenbaum, "Computer Networks," 4th Int'l CAN Conf., Berlin, Germany, 1997.

Thodorides, "Wireless Integrated Network Sensors," Power Point Presentation, Publisher: unknown, Apr. 15, 2003, pp. 1-19.

Thomas, "Extending CAN Networks by Incorporating Remote Bridging," ESTeem Radios, Nov. 1994.

Thomas, "Extending CAN Networks by Incorporating Remote Bridging," 4th Int'l CAN Conf., Berlin, Germany, available at http://www.can-cia.org/fileadmin/cia/files/icc/4/thom as.pdf (1997).

Tobagi et al, "Packet Radio and Satellite Networks," IEEE Communications Magazine, vol. 22, No. 11, Nov. 1984, pp. 24-40.

Toh, "A Novel Distributed Routing Protocol to Support Ad-Hoc Mobile Computing," Conference Proceedings of the 1996 IEEE Fifteenth Annual International Phoenix Conference on Computers and Communications, Mar. 27-29, 1996, pp. 480-486.

Totolo, Home RF, a New Protocol on the Horizon, Feb. 1999, available at www.hometoys.com/htinews/feb99/articles/totolo/totolo.htm on Mar. 2, 2009.

Transmission Control Protocol; "DARPA Internet Program Protocol Specification," John Postel Editor; Information Sciences Institute, University of Southern California, California; Sep. 1981; pp. 1-85.

Varadhan et al., "SDRP Route Construction," Internet Draft, available at draft-ietf-sdr-route-construction-01.{ps,txt}, Feb. 27, 2005, pp. 1-12.

Vardhan, "Wireless Integrated Network Sensors (WINS): Distributed in Situ Sensing for Mission and Flight Systems," 2000 IEEE Aerospace Conference Proceedings, (2000).

Verizon, "Verizon Broadband Anytime," Copyright 2003, https://www33.verizon.com/wifi/login/loacations/locations-remote.jsp (2 pages).

Wang et al., "Energy-Scalable Protocols for Battery Operated MicroSensor Networks," Department of Electrical Engineering Massachusetts Institute of Technology, 1999.

Warrock, "School Give Report on Radio-Based FMS," Energy User News, Nov. 7, 1983, pp. 1.

Weiser, "Some Computer Science Issues in Ubiquitous Computing," Communications of the ACM, Jul. 1993.

Weiser, "The Computer for the 21st Century," Scientific American, Sep. 1991.

Westcott et al., "A Distributed Routing Design for a Broadcast Environment," 1982 IEEE Military Communications Conference on Progress in Spread Spectrum Communications, vol. 3, Oct. 17-20, 1982, pp. 10.4.1-10.4.5.

Westcott et al., "Hierarchical Routing for Very Large Networks," IEEE Military Communications Conference, Oct. 21-24, 1984, Conference Record vol. 2, pp. 214-218.

Westcott, "Issues in Distributed Routing for Mobile Packet Radio Networks," Proceedings of Computer Networks Compcon '82, Sep. 20-23, 1982, pp. 233-238.

Wey, Jyhi-Kong et al., "Clone Terminator: An Authentication Service for Advanced Mobile Phone System", 1995 IEEE 45th Vehicular Technology Conference, Chicago, IL, pp. 175-179 + Cover Page, Jun. 25-28, 1995.

Wikipedia, "Ad Hoc On-Demand Distance Vector Routing," available at http://en.wikipedia.org/wiki/Ad_Hoc_On-Demand_Distance_Vector_Routing on Aug. 25, 2009, pp. 1-3.

Wikipedia, "Border Gateway Protocol," available at http://en.wikipedia.org/wiki/Border_Gateway_Protocol, Jun. 24, 2009, pp. 1-13.

Wikipedia, "Distance-Vector Routing_Protocol," available at http://en.wikipedia.org/wiki/Distance-Vector_Routing_Protocol, Jun. 24, 2009, pp. 1-4.

Wikipedia, "Enhanced Interior Gateway Routing Protocol," available at http://en.wikipedia.org/wiki/EIGRP, Jun. 24, 2009, pp. 1-7.

Wikipedia, "Exterior Gateway Protocol," available at http://en.wikipedia.org/wiki/Exterior Gateway_Protocol, Jun. 24, 2009, pp. 1.

Wikipedia, "Interior Gateway Routing Protocol," available at http://en.wikipedia.org/wiki/Interior Gateway Routing_Protocol, Jun. 24, 2009, pp. 1-2.

Wikipedia, "IS-IS," available at http://en.wikipedia.org/wiki/IS-IS, Jun. 24, 2009, pp. 1-3.

Wikipedia, "L. R. Ford, Jr.," available at http://en.wikipedia.org/wiki/L._R._Ford,_Jr, Jun. 24, 2009, pp. 1.

Wikipedia, "Richard E. Bellman," available at http://en.wikipedia.org/wiki/Richard_Bellman, Jun. 24, 2009, pp. 1-3.

Wikipedia, "Routing Information Protocol," available at http://en.wikipedia.org/wiki/Routing_Information_Protocol, Jun. 24, 2009, pp. 1-4.

Will et al., "Wireless Networking for Control and Automation of Off-road Equipment," ASAE, Jul. 18-21, 1999, pp. 1-10.

Wilson, Lexicon 700t Touchscreen Remote, Jan. 1, 1999, available at http://avrev.com/home-theater-remotes-system-control/remotes-system on Mar. 2, 2009, pp. 1-3.

Wu, Jie, "Distributed System Design", Department of Computer Science and Engineering, Florida Atlantic University, CRC Press, pp. 177-180, 204 + Cover Pages, 1999.

Haartsen, "Bluetooth-The Universal Radio Interface for Ad Hoc, Wireless Connectivity;" Ericsson Review No. 3, 1998; pp. 110-117.

Hahn et al., "Packet Radio Network Routing Algorithms: A Survey," IEEE Communications Magazine, vol. 22, No. 11, Nov. 1984, pp. 41-47.

Hai Omni, Features & Specifications, Home Automation, Inc., available at http://web.archive.org/web/19970216055832/www.homeauto.com/omni on Feb. 17, 2009, pp. 1-6.

Hall, "Tactical Internet System Architecture for Task Force XXI," 1996 IEEE, pp. 219-230.

Hamilton et al., "Optimal Routing in Multihop Packet Radio Networks," 1990 IEEE, pp. 389-396.

Harrington, "More Visible Vehicles," ActionLINE, Jul. 2003 (4 pages).

Hedrick, "An Introduction to IGRP," Rutgers, The State University of New Jersey, Center for Computers and Information Services, Laboratory for Computer Science Research, Aug. 22, 1991 (Updated Aug. 10, 2005), pp. 1-21.

Hedrick, "Routing Information Protocol" (Jun. 1988), RFC 1058, available at Http://Tools.Ietf.Org/Html/Rfc1058, Jun. 24, 2009, pp. 1-34.

Hinden et al., "The DARPA Internet Gateway," RFC 823, Publisher: unknown, Sep. 1982, pp. 1-43.

Hogan, "Call of the Wi-Fi," Entrepeneur Magazine, Sep. 2003, pp. 39-42.

Holtsville et al., "Symbol Technologies, Telxon and Aironet Commit to Future Interoperability of Their Wireless Local Area Networks Based on the IEEE 802.11 Specification," Business Wire, Jun. 24, 1996, available at http://www.thefreelibrary.co m/_/print/PrintArticle.aspx?id=18414624, pp. 1-3.

Home Toys, Inc., "HTINews Review," available at http://www.hometoys.com/htinews/aug97/reviews/homevis/homevis1.htm on Mar. 2, 2009, pp. 1-26.

Honeywell, Inc., "Honeywell Home Control Version 2.0 Demonstratin," available at http://web.archive.org/web/19980630195929/www.hbc.honeywell.com/ on Mar. 5, 2009 (7 pages).

Hong et al., "U.S. Lightning Market Characterization, vol. II.: Energy Efficient Lighting Technology Options," Sep. 30, 2005, Reportprepared for Building Technologies Program, Office of Energy Efficiency and Renewable Energy, pp. 136.

Hotel Technology Next Generation, "A Guide for Understanding Wireless in Hospitality," an HTNG White Paper, Jun. 2006 (Jayne O'Neill, ed.), pp. 1-77.

Hruschka et al., "Packet Radio, Drahtlose Datenubertragung im Amateurfunk," Elektor, Jun. 1991, pp. 54-57 and 84.

Hsu et al., "Wireless Communications for Smart Dust," Berkeley: UCLA, Jan. 30, 1998, pp. 1-20.

Internet Protocol, Version 4 (IPv4), RFC791 (Sep. 1981).

Internet Protocol, Version 6 (IPv6) Specification, RFC 2460 (Dec. 1998).

Internet Protocol; DARPA Internet Program Protocol Specification, John Postel Editor; Information Sciences Institute, University of Southern California, California; Sep. 1981; pp. 1-45.

Iwata et al., "Scalable Routing Strategies for Ad Hoc Wireless Networks," IEEE Journal on Selected Areas in Communications, vol. 17, No. 8, Aug. 1999, pp. 1369-1379.

Jacobsen, "The Building Blocks of a Smart Sensor for Distributed Control Networks," IEEE Technical Applications Conference Northcon, Nov. 4-6, 1998, pp. 285-290.

JDS Technologies, "Stargate Interactive Automation System," 1998, pp. 1-2.

JDS Technologies, "Stargate, Operation Manual," Mar. 2000, pp. 1-114.

JDS Technologies, "Support: Protocol Specifications," available at http://jdstechnologies.com/protocol.htm, on Feb. 16, 2009, pp. 1-32.

JDS Technologies, "TimeCommander, TimeCommander Plus, User Guide," Jun. 1998, pp. 1-95.

JDS Technologies, "Web Xpander, Installation and Operation Manual," Feb. 2004, pp. 1-34.

Jimenez-Cedeno et al., "Centralized Packet Radio Network: A Communication Approach Suited for Data Collection in a Real-Time Flash Flood Prediction System," ACM-SAC 1993, pp. 709-713.

Johnson Controls, Inc., LonWorks® Digital Controller, 1998, pp. 1-12.

Johnson et al., "Dynamic Source Routing in Ad Hoc Wireless Networks", Computer Science Department, Carnegie Mellon University, A Chapter in Mobile Computing, vol. 353, pp. 1-18, 1996.

Johnson et al., "Dynamic Source Routing in Ad Hoc Wireless Networks," reprinted in Mobile Computing; Tomasz Imielinski and Hank Korth eds., 1996; Kluwer Academic Publishers, pp. 153-181.

Johnson et al., "Protocols for Adaptive Wireless and Mobile Networking," IEEE Personal Communications, 3(1), Feb. 1996, pp. 1-18.

Johnson et al., "Route Optimization in Mobile IP," Internet Draft (Nov. 28, 1994), available at http://www.monarch.cs.rice.edu/internetdrafts/draft-ietf-mobileip-optim-00.txt., Sep. 26, 2009, pp. 1-29.

Johnson, "Mobile Host Internetworking Using IP Loose Source Routing," Carnegie Mellon University CMU-CS-93-128, DARPA Order No. 7330, Feb. 1993, pp. 1-18.

Johnson, "Routing in Ad Hoc Networks of Mobile Hosts," 1995 IEEE, pp. 158-163.

Johnson, "Scalable and Robust Internetwork Routing for Mobile Hosts," 1994 IEEE, pp. 1-11.

Jubin et al., "The DARPA Packet Radio Network Protocols," Proceedings of the IEEE, vol. 75, No. 1, Jan. 1987, pp. 21-32.

Jubin, "Current Packet Radio Network Protocols," Proc. of the IEEE Infocom (Mar. 26-28, 1985), pp. 86-92.

Kaashoek et al., "FLIP: An Internetwork Protocol for Supporting Distributed Systems," ACM Transactions on Computer Systems, vol. 11, No. 1, Feb. 1993, pp. 73-106.

Kaiser et al., "Low Power Wireless Integrated Microsensors (LWIM), Request for Support to Project", UCLA Electrical Engineering Department, Rockwell Science Center, Sep. 13, 1994, 71 pages.

Kaiser et al., "Low Power Wireless Integrated Microsensors (LWIM)," UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.

Custom Solutions, Inc., HomeVision-PC Version 2.62, Owner's Manual (1997), pp. 1-234.

Custom Solutions, Inc., Media Information, Feb. 16, 1999, available at http://web.archive.org/web/19990502073249/www.csi3.com/hv_media.htm on Feb. 27, 2009, pp. 1-2.

Custom Solutions, Inc., Using Enerzone StatNet Thermostats with HomeVision (1998) pp. 1-16.

Davies et al., "Internetworking in the Military Environment," Proceedings of IEEE Infocom '82 (1982) pp. 19-29.

Davies et al., "The Application of Packet Switching Techniques to Combat Net Radio," Proceedings of the IEEE, vol. 75, No. 1, Jan. 1987, pp. 4355.

Davis et al., "Knowledge-Based Management of Cellular Clone Fraud," IEEE (1992), pp. 230-234.

Deering et al., "Internet Protocol, Version 6 (IPv6)," RFC1883, Publisher: unknown, Dec. 1995, pp. 1-37.

Deering et al., "Internet Protocol, Version 6 (IPv6)," RFC2460, The Internet Society, Dec. 1998, pp. 1-39.

Diaz, "Intervehicular Information System (IVIS): the Basis for a Tactical Information System," SAE International, Mar. 1994, pp. 1-14.

Dixon et al., "Addressing, Bridging and Source Routing," IEEE Network, Jan. 1988, vol. 2, No. 1, pp. 25-32.

Dong et al., "Low Power Signal Processing Architectures for Network Microsensors," ACM, 1997, pp. 173-177.

Echelon Corp., "LonTalk® Protocol Specification," Doc. No. 19550, available at http://ww w.enerlon.com/JobAids/Lontalk%20Protocol%20Spec.pdf (1994).

Echelon Corp., "Series 90TH-30 PLC LonWorks® Bus Interface Module User's Manual," Doc. No. GFK-1322A, available at http://www.pdfsupply.com/pdfs/gfk1322a.pdf (1997).

Elson et al., "Fine-Grained Network Time Synchronization Using Reference Broadcasts," UCLA Computer Science Department, May 17, 2002, pp. 1-14.

Eng et al., "Bahama: A Broadband Ad-Hoc Wireless ATM Local-Area Network," 1995 IEEE International Conference on Communications, Jun. 18-22, 1995, pp. 1216-1223.

Ephremides et al., "A Design Concept for Reliable Mobile Radio Networks with a Frequency Hopping Signaling," IEEE 1987, pp. 1-18.

ESTeem Application Paper - AgriNorthwest Employee's Provide Wireless Control System (describing a system that was in use prior to March 1999).

ESTeem Application Paper—Allen-Bradley Goes Wireless on Alaska's North Slope (describing a system that was in use prior to Mar. 1999).

ESTeem Application Paper—Build Your Own Wireless Power Distribution System (describing a system that was in use prior to Mar. 1999).

ESTeem Application Paper—Lost Cabin Gas Plant Uses Wireless Control to Enhance Production & Safety (describing a system that was in use prior to Mar. 1999).

ESTeem Application Paper—Northwest Farm Applies Wireless Solution (describing a system that was in use prior to Mar. 1999).

ESTeem Application Paper—Wireless Control of Polluted Water (describing a system that was in use prior to Mar. 1999).

ESTeem Application Paper—Wireless Mobile Mapping System (describing a system that was in use prior to Mar. 1999);.

ESTeem Application Paper—Wireless Networking for Kodiak's Coast Guard Station (describing a system that was in use prior to Mar. 1999);.

ESTeem Application Paper—Wireless Networking for Natural Gas Extraction (describing a system that was in use prior to Mar. 1999).

ESTeem Models 85, 95, 96, & 98 User's Manual (describing the ESTeem 96C and 96F radios used prior to 1999).

Estrin et al., "Next Century Challenges: Scallable Coordination in Sensor Networks," ACM, 1999, pp. 263-270;.

Estrin et al., "RFC1940-Source Demand Routing: Packet Format and Forwarding Specification (Version 1)," Network Working Group, May 1996, available at http://www.faqs.org/rfcs/rfc1940.html, Sept. 14, 2009, pp. 1-20.

Estrin et al., "Source Demand Routing: Packet Format and Forwarding Specification (Version 1)", Network Working Group, Internet Draft, Jan. 19, 1995, pp. 1-28.

Federal Communications Commission, "Notice of Proposed Rule Making and Order," Adopted Dec. 17, 2003, Released Dec. 30, 2003 (54 pages).

Frank, "Transmission of IP Datagrams Over NET/ROM Networks, ARRL Amateur Radio 7th Computer Networking Conference," Oct. 1988, pp. 65-70.

Frank, "Understanding Smart Sensors," Artech House (1996).

Frankel, "Packet Radios Provide Link for Distributed Survivable Command Control Communications in Post-Attack Scenarios," Microwave System News, Jun. 1983, Circle Reader Service No. 77, pp. 80-108.

Franz, "HiperLAN—Der ETSI-Standard fur locale Funknetze," NTZ, Sep. 1995, 10 pages.

Fullmer, "Collision Avoidance Techniques for Packet-Radio Networks," Dissertation, University of California at Santa Cruz, Jun. 1998, pp. 1-162.

Gale et al., "The Impact of Optical Media on Information Publishing," Bulletin of the American Society For Information Science, vol. 12, No. 6, Aug./Sep. 1986, pp. 12-14.

Garbee, "Thoughts on the Issues of Address Resolution and Routing in Amateur Packet Radio TCP/IP Networks," ARRL Amateur Radio 6th Computer Networking Conference, Aug. 1987, p. 56-58.

Garcia-Luna-Aceves, "A Fail-Safe Routing Algorithm for Multishop Packet-Radio Networks," IEEE Infocom '86, Technical Sessions: Apr. 8-10, 1986, pp. 434-442.

Garcia-Luna-Aceves, "A Minimum-hop Routing Algorithm Based on Distributed Information," Elsevier Science Publishers, B.V. (North Holland), 1989, pp. 367-382.

Garcia-Luna-Aceves, "Routing Management in Very Large Scale Networks," Elsevier Science Publishers, B.V. (North Holland), 1988, pp. 81-93.

Garcia-Luna-Aceves, J.J et al., "Wireless Internet Gateways (Wings)", 1997 IEEE, pp. 1271-1276, 1997.

GE Security, "NetworkX NX-4," 2004, pp. 1-2.

GE Security, "NetworkX NX-548E," 2006, pp. 1-2.

Geier et al., "Networking Routing Techniques and their Relevance to Packet Radio Networks," ARRL/CRRLAmateur Radio 6th Computer Networking Conference, London, Ontario, Canada, Sep. 1990, pp. 105-117.

Gerla et al., "Multicluster, Mobile, Multimedia Radio Network," UCLA Computer Science Department; Baltzer Journals; Wireless Networks; Jul. 12, 1995, pp. 255-265.

Golden Power Manufacturing, "6030 PCT Programmable Communicating Thermostat," Author: unknown, 2007, pp. 1-3.

Golden Power Manufacturing, "Ritetemp Universal Wireless Thermostat," Author: unknown, 2007, pp. 1-2.

Goldman et al., "Impact of Information and Communications Technologies on Residential Customer Energy Services," Paper, Berkeley: UCLA, Oct. 1996, pp. 1-89.

Gower et al., "Congestion Control Using Pacing in a Packet Radio Network", Rockwell International, Collins Communications Systems Division, Richardson, TX, IEEE 1982, pp. 23.1-1-23.1-6, 1982.

Grady et al., "Telemetry Options for Small Water Systems," Special Report SR14-1999, Publisher: unknown, Sep. 1999, pp. 1-23.

Guardian Alarms, Inc., "Home Security System—Model 7068 Digital Dialer Interface," Author: unknown, available at www.guardianalarms.net, 2007, pp. 1.

Guardian Alarms, Inc., "Security Company—Home Alarm System Monitoring—AES 7067 IntelliTap-II Digital Dialer Interface," Author: unknown, available at www.guardianalarms.net, 2007, pp. 1.

Guardian Alarms, Inc., "Security System—Alarm System Monitoring—7160 EZ Router," Author: unknown, available at www.guardianalarms.net, 2007, pp. 1.

Guardian Alarms, Inc., "Security System—Alarm System Monitoring—NET 7000," Author: unknown, available at www.guardianalarms.net, 2007, pp. 1.

Guardian Alarms, Inc., "Security System—Alarm System Monitoring—Radionics FDX," Author: unknown, available at www.guardianalarms.net, 2007, pp. 1.

U.S. Appl. No. 12/477,329 Non-Final Office Action dated Aug. 19, 2010.

U.S. Appl. No. 12/477,329 Non-Final Office Action dated Dec. 28, 2009.

U.S. Appl. No. 12/356,358 Final Office Action dated Sep. 15, 2010.

U.S. Appl. No. 12/356,358 Non-Final Office Action dated Jan. 21, 2010.

U.S. Appl. No. 10/792,608 Non-Final Office Action dated Jan. 22, 2010.

U.S. Appl. No. 10/792,608 Final Office Action dated Sep. 2, 2009.

U.S. Appl. No. 10/792,608 Non-Final Office Action dated Feb. 3, 2009.

U.S. Appl. No. 10/792,608 Final Office Action dated Aug. 19, 2008.

U.S. Appl. No. 12/792,608 Restriction Requirement dated Dec. 21, 2007.

U.S. Appl. No. 10/792,608 Non-Final Office Action dated Mar. 21, 2007.

U.S. Appl. No. 12/816,266 Non-Final Office Action dated Oct. 12, 2010.

U.S. Appl. No. 11/814,632 Final Office Action dated Dec. 7, 2010.

U.S. Appl. No. 11/814,632 Non-Final Office Action dated Jul. 13, 2010.

U.S. Appl. No. 11/125,009 Non-Final Office Action dated Dec. 9, 2010.

U.S. Appl. No. 11/125,009 Non-Final Office Action dated Mar. 1, 2010.

U.S. Appl. No. 11/125,009 Non-Final Office Action dated Apr. 6, 2009.

U.S. Appl. No. 11/125,009 Non-Final Office Action dated Oct. 1, 2008.

U.S. Appl. No. 11/125,009 Notice of Allowance dated Sep. 21, 2009.

U.S. Appl. No. 12/169,536 Non-Final Office Action dated Oct. 20, 2010.

U.S. Appl. No. 12/689,220 Non-Final Office Action dated Dec. 15, 2010.

U.S. Appl. No. 11/300,902 Non-Final Office Action dated Aug. 6, 2010.

U.S. Appl. No. 11/300,902 Non-Final Office Action dated Nov. 17, 2009.
U.S. Appl. No. 11/300,902 Non-Final Office Action dated Oct. 7, 2008.
U.S. Appl. No. 11/300,902 Final Office Action dated Jun. 4, 2008.
U.S. Appl. No. 11/300,902 Non-Final Office Action dated Oct. 11, 2007.
U.S. Appl. No. 11/300,902 Advisory Action dated Aug. 11, 2008.
U.S. Appl. No. 12/482,892 Non-Final Office Action dated Dec. 13, 2010.
Karn et al., "Packet Radio in the Amateur Service," IEEE Journal on Selected Areas in Communications, vol. SAC-3, No. 3, May 1985, pp. 431-439.
Katz et al., "The Bay Area Research Wireless Access Network (BARWAN)" (Jun. 1996) (presentation paper), http://daedalus.cs.berkeley.edu/talks/retreat.6.97/BARWAN.597.ppt, pp. 1-66.
Katz et al., "Towards a Wireless Overlay Internetworking Architecture", DARPA ITO Sponsored Research, 1997 Project Summary, University of California, Berkeley, pp. 1-8, Including a Slide Show Presentation of 56 pages at http://daedalus.cs.berkeley.edu/talks/retreat.6.96/overview.pdf.
Kemp, "Home Automation Application Guide," Applications for Home Automation in Any Home, vol. 1, 2000, pp. 1-106.
Kleinrock et al., "Hierarchical Routing for Large Networks, Performance Evaluation, and Optimization," Computer Networks 1 (1977), pp. 155-174.
Kohno et al., "An Adaptive Sensor Network System for Complex Environments in Intelligent Autonomous Systems (Kakazu et al., eds.)," IOS Press, 1998, pp. 21-28.
Kooser et al., "Testing 1-2-3," Entrepreneur Magazine, Sep. 2003, pp. 27-30.
Lacoss, "Distributed Sensor Networks, Final Report," Lincoln Laboratory at Massachusetts Institute of Technology, Sep. 30, 1986, pp. 1-225.
Lauer et al., "Survivable Protocols for Large Scale Packet Radio Networks," IEEE Global Telecommunications Conference, Nov. 26-29, 1984, vol. 1 of 3, pp. 468-471.
Lauer, "Packet-Radio Routing, Routing in Communications Networks," Ch. 11 (1995) pp. 351-396.
Lee et al., "Distributed Measurement and Control Based on the IEEE 1451 Smart Transducer Interface Standards," Proceedings of the 16th IEEE Instrumentation and Measurement Technology Conference, vol. 1, May 24-26, 1999, IEEE, pp. 608-613.
Leiner et al., "Goals and Challenges of the DARPA GloMo Program;" IEEE Personal Communications; Dec. 1996, vol. 3, No. 6; pp. 34-45.
Leviton Manufacturing Co., Inc., "The DECORA® Collection of Designer Devices," 2006, pp. 1-85.
Lewis et al., "Packet-Switching Applique for Tactical VHF Radios," 1987 IEEE Military Communications Conference, Oct. 19-22, 1987, Conference Record vol. 2 of 3, pp. 449-455.
Lin et al., "CMOS Front End Components for Micropower RF Wireless Systems;" EED, UCLA Electrical Engineering Department; 1998, pp. 1-5.
Linear Corporation, "Supervised Digital Security Transmitter t-90, Installation Instructions," 2006, pp. 1-2.
Linear Corporation, "Supervised Digital Security Transmitters TX-91, TX-92, TX-94, Operation Instructions," 1993, pp. 1.
Linear Corporation, "Supervised Wireless Receiver and Zone Expander SRX-64A, Installation Instructions," 2003, pp. 1-2.
Local and Metropolitan Area Networks: Wireless Medium Access Control (MAC) and Physical (PHY) Specifications, Author: unknown; IEEE, Nov. 1997, pp. 1-98.
Clare, "AWAIRS Progress Review: Planned Milestones," UCLA Rockwell Science Center, Nov. 20, 1998.
Lougheed et al., "A Border Gateway Protocol 3 (BGP-3)," RFC 1267, (Oct. 1991), available at http://tools.ietf.org/html/rfc1267, Jun. 24, 2009, pp. 1-36.
Lutron Electronics Co. Inc., Homeowner's Guide for the RadioRA® Quick Start Package, 2004, pp. 1-8.
Lutron Electronics Co. Inc., How to Retrofit RadioRA® Wall-Mounted Master Control into an existing home, Application #41, 2004, pp. 1-2.
Lutron Electronics Co. Inc., IR/RS232 Interface for Bang & Olufsen® Remote Control and RadioRA®, Application Note #119, 2004, pp. 1-3.
Lutron Electronics Co. Inc., Level Capture with a RadioRA® Master Control, Application Note #73, 2003, pp. 1-3.
Lutron Electronics Co. Inc., Modem Installation for HomeWorks®, Application Note #9, 1998, pp. 1-4.
Lutron Electronics Co. Inc., RadioRA® RA-IR-KIT Installation Instructions, Application Note #61, 2000, pp. 1-4.
Lutron Electronics Co. Inc., RadioRA® RF Signal Repeater, 1998, pp. 1-2.
Lutron Electronics Co. Inc., RadioRA® Single-Location Switch, Controls for Permanently Installed Lighting Loads, 1998, pp. 1-2.
Lutron Electronics Co. Inc., RadioRA® Table Lamp Controls, Dimming and Switching Controls for Table and Floor Lamps, 1999, pp. 1-2.
Lutron Electronics Co. Inc., Using a Photocell with the RadioRA® System, Application Note #45, 1998, pp. 1-4.
Lutron Electronics Co. Inc., Using an Astronomic Timeclock with the RadioRA® System, Application Note #42, 1998, pp. 1-2.
Lutron Electronics Co. Inc., Using the RadioRA® System to Activate Scenes 5-16 on a GRAFIK Eye® Control Unit, Application Note #48, 1998, pp. 1-4.
Lutron Electronics Co. Inc., Using the RadioRA® Telephone Interface, Application Note #46, 1998, pp. 1-2.
Lynch et al., "Application of Data Compression Techniques to a Large Bibliographic Database," Proceeding of the Seventh International Conference on Very Large Databases, Cannes, France, Sep. 9-11, 1981 (Washington, DC: IEEE Computer Society Press, 1981), pp. 435-447.
Lynch et al., "Beyond the Integrated Library System Concept: Bibliographic Networking at the University of California," Proceedings of the Second National Conference on Integrated Online Library Systems Proceedings, Sep. 1984, pp. 243-252.
Lynch et al., "Conservation, Preservation and Digitization, Energies for Transition," Proceedings of the Fourth National Conference of the Association of College and Research Libraries, Baltimore, MD, Apr. 9-12, 1986 (Chicago, IL: Association of College and Research Libraries, 1986), pp. 225-228.
Lynch et al., "Document Delivery and Packet Facsimile," Proceedings of the 48th ASIS Annual Meeting, vol. 22, Oct. 20-24, 1985, pp. 11-14.
Lynch et al., "Electronic Publishing, Electronic Imaging, and Document Delivery, Electronic Imaging '86," (Boston, MA: Institute for Graphic Communication, Inc., 1986), pp. 662-667.
Lynch et al., "Library Applications of Electronic Imaging Technology," Information Technology and Libraries, Jun. 1986, pp. 100-105.
Lynch et al., "Packet Radio Networks: Architectures, Protocols, Technologies and Applications," Pergamon Press, 1 ed., 1987, pp. 1-275.
Lynch et al., "Public Access Bibliographic Databases in a Multicampus University Environment, Databases in the Humanities and Social Sciences—4," Proceedings of the International Conference on Databases in the Humanities and Social Sciences, Jul. 1987, Learned Information, Inc., 1989, pp. 411-419.
Lynch et al., "The Telecommunications Landscape: 1986," Library Journal, Oct. 1, 1986, pp. 40-46.
ADEMCO Group, 7720P Programming Tool, User Guide, Mar. 1992, ADEMCO Group, Author: unknown, available at http://www.guardianalarms.net; pp. 1-8.
ADEMCO Group, 7720Plus Subscriber Radio Installation Instructions, Oct. 1996, ADEMCO Group, Author: unknown, available at http://www.guardianalarms.net; pp. 1-30.
ADEMCO Group, 7720ULF Combination Fire Control and Long Range Radio Transmitter, 1997, ADEMCO Group, Author: unknown, available at http://web.archive.org/web/19990501210612/www.ademco.com/ademco on Mar. 5, 2009, pp. 1-3.
ADEMCO Group, 7720ULF Subscriber Radio, Installation Instructions, Mar. 1995, ADEMCO Group, Author: unknown, available at http://www.guardianalarms.net, pp. 1-20.

ADEMCO Group, 7720V2 Self-Contained Long Range Radio Transmitter, 1997, ADEMCO Group, Author: unknown, available at http://web.archive.org/web/19990501212349/www.ademco.com/ademco on Mar. 5, 2009 pp. 1-4.

ADEMCO Group, 7720V2 Subscriber Radio, Installation Instructions, Jun. 1996, ADEMCO Group, Author: unknown, available at http://www.guardianalarms.net, pp. 1-24.

ADEMCO Group, 7810iR Internet Receiver, Installation and Setup Guide, May 2002, ADEMCO Group, Author: unknown, available at http://www.guardianalarms.net, pp. 1-58.

ADEMCO Group, 7820 Appendicies, Mar. 1995, ADEMCO Group, Author: unknown, available at http://www.guardianalarms.net, pp. 1-2.

ADEMCO Group, 7820 Integrated Radio Transmitter, Installation Instructions, Aug. 1995, ADEMCO Group, Author: unknown, available at http://www.guardianalarms.net, pp. 1-52.

ADEMCO Group, 7825 Outdoor Antenna with Bracket, Installation Instructions, Feb. 1995, ADEMCO Group, Author: unknown, available at http://www.guardianalarms.net, pp. 1-2.

ADEMCO Group, 7830R SafetyNet Subscriber Radio, Installation Instructions, Jun. 1996, ADEMCO Group, Author: unknown, available at http://www.guardianalarms.net, pp. 1-32.

ADEMCO Group, 7830R Subscriber Transmitter, 1997, available at http://web.archive.org/web/19990501215427/www.ademco.com.ademco on Mar. 5, 2009, pp. 1-3.

ADEMCO Group, 7835C Cellular Control Channel Transceiver, Installation and Setup Guide, Sep. 1998, ADEMCO Group, Author: unknown, available at http://www.guardianalarms.net, pp. 1-32.

ADEMCO Group, 7835C Cellular SafetyNet Subscriber Radio Transceiver, 1997 ADEMCO Group, Author: unknown, available at http://web.archive.org/web/19990801221202/www.ademco.com/on Mar. 5, 2009, pp. 1-3.

ADEMCO Group, 7845C Cellular Control Channel Transceiver, Installation and Setup Guide, Sep. 1990, ADEMCO Group, Author: unknown, available at http://www.guardianalarms.net, pp. 1-104.

ADEMCO Group, 7845CZ Seven Zone Cellular Control Channel Transceiver, Installation and Setup Guide, Sep. 2001, ADEMCO Group, Author: unknown, available at http://www.guardianalarms.net, pp. 1-64.

ADEMCO Group, 7845i Internet Communications Module, Installation and Setup Guide, Mar. 2002, ADEMCO Group, Author: unknown, available at http://www.guardianalarms.net, pp. 1-42.

ADEMCO Group, 7920SE 900MHz Fully Synthesized Transceiver, 1997, ADEMCO Group, Author: unknown, available at http://web.archive.org/web/19990501222639/www.ademco.com/ on Mar. 5, 2009, pp. 1-3.

ADEMCO Group, 7920SE Transceiver, Installation Instructions, Apr. 1995, ADEMCO Group, Author: unknown, available at http://www.guardianalarms.net, pp. 1-80.

ADEMCO Group, ADEMCO World Leader in Home Security Products, 1997, ADEMCO Group, Author: unknown, available at http://web.archive.org/web/19990428164624/www.ademco.com/ademco on Mar. 5, 2009, pp. 1-2.

ADEMCO Group, AlarmNet Introduces Control Channel Cellular for Commercial Fire/Burglary Applications, ADEMCO Group (press release), Aug. 31, 1999, available at http://web.archive.org/web/19990420234120/www.ademco.com/pr0831 on Mar. 31, 2009.

ADEMCO Group, AlarmNet, 1997, ADEMCO Group, Author: unknown, available at http://web.archive.org/web/199904240234130/www.ademco.com/ademco on Mar. 5, 2009, pp. 1-3.

ADEMCO Group, Alpha Vista No. 5130XT Security System, Installation Instructions, Mar. 1989, ADEMCO Group, Author: unknown, pp-96.

ADEMCO Group, Compass Network Downloader, ADEMCO Group, Author: unknown, Date: unknown, available at http://www.guardianalarms.net pp. 1-109.

ADEMCO Group, Compass, 1997, ADEMCO Group, Author: unknown, available at http://web.archive.org/web/19990209094401/www.ademco.com/ademco on Mar. 5, 2009.

ADEMCO Group, Control/Communicator 5110XM User's Manual, Apr. 1996, ADEMCO Group, Author: unknown, pp. 1-30.

ADEMCO Group, Fire and Burglary System Model 5120XM User's Manual, Apr. 1996, ADEMCO Group, Author: unknown, pp. 1-40.

ADEMCO Group, Home Page, ADEMCO Group, Author: unknown, available at http://web.archive.org/web/19961023204954/http://ademco.com/ on Mar. 5, 2009, pp. 1.

ADEMCO Group, LYNX—Quick Install Security System, 1997, ADEMCO Group, Author: unknown, available at http://web.archive.org/web/19990116225005 pp. 1-3.

ADEMCO Group, Lynx Quick Start Guide, Oct. 1998, ADEMCO Group, Author: unknown, pp. 1-4.

ADEMCO Group, Lynx Security System Installation and Setup Guide, Oct. 1998, ADEMCO Group, Author: unknown, pp. 1-48.

ADEMCO Group, Lynx Security System Programming Form & Summary of Connections, Oct. 1998, ADEMCO Group, Author: unknown, pp. 1-16.

ADEMCO Group, Lynx Security System User Guide, Oct. 1998, ADEMCO Group, Author: unknown, pp. 1-40.

ADEMCO Group, Powerline Carrier Device Modules, 1997 ADEMCO Group, Author: unknown, available at http://web.archive.org/web/19990218035115/www.ademco.com/ademco on Mar. 5, 2009, pp. 1-2.

ADEMCO Group, Remote Keypads 6128, 6137, 6137R, 6138, 6139 & 6139R, Installation Guide, Aug. 1998, ADEMCO Group, Author: unknown, pp. 1-2.

ADEMCO Group, Security System Model 4110DL Programming Form, Oct. 1996, ADEMCO Group, Author: unknown, pp. 1-8.

ADEMCO Group, Security System Model 4110XM Programming Form, Jul. 1996, ADEMCO Group, Author: unknown, pp. 1-4.

ADEMCO Group, Security System Model 4120EC Programming Form, Sep. 1993, ADEMCO Group, Author: unknown, pp. 1-2.

ADEMCO Group, Security System Model 4120XM Programming Form, Sep. 1992, ADEMCO Group, Author: unknown, pp. 1-4.

ADEMCO Group, Security System Model 4130XT/4140/5130XT Programming Form, Jul. 1989, ADEMCO Group, Author: unknown, pp. 1-2.

ADEMCO Group, Security System Model 4140XMP Programming Form, Jan. 1992, ADEMCO Group, Author: unknown, pp. 1-2.

ADEMCO Group, Security System Model 4140XMPT2 Programming Form, Apr. 1996, ADEMCO Group, Author: unknown, pp. 1-4.

ADEMCO Group, Security System Model 5110XM Programming Form, Apr. 1996, ADEMCO Group, Author: unknown, pp. 1-4.

ADEMCO Group, Security System Model 5120XM Programming Form, Jun. 1996, ADEMCO Group, Author: unknown, pp. 1-4.

ADEMCO Group, Security System Model 5140XM Programming Form, Jun. 1993, ADEMCO Group, Author: unknown, pp. 1-4.

ADEMCO Group, Security System Model Vista-10 Programming Form, Sep. 1994, ADEMCO Group, Author: unknown, pp. 1-4.

ADEMCO Group, Security System Model Vista-10SE Programming Form, Apr. 1997, ADEMCO Group, Author: unknown, pp. 1-24.

ADEMCO Group, Security System Model Vista-128B Commercial Burglary Partitioned Security System with Scheduling, Quick Start Guide, Jun. 1998, ADEMCO Group, Author: unknown, pp. 1-39.

ADEMCO Group, Security System User's Manual, Sep. 1996, ADEMCO Group, Author: unknown, pp. 1-88.

ADEMCO Group, the Vista-100 Series, 1997, ADEMCO Group, Author: unknown, available at http://web.archive.org/web19970620010543/www.ademco.com/ademco on Mar. 5, 2009.

ADEMCO Group, The Vista-10SE, 1997, ADEMCO Group, Author: unknown, available at http://web.archive.org/web/19990502214402/www.ademco/com/ademco on Mar. 5, 2009, pp. 1-4.

ADEMCO Group, via16 Programming Form, Jul. 1993, ADEMCO Group, Author: unknown, pp. 1-2.

ADEMCO Group, via16 Security System, Installation Instructions, Jan. 1992, ADEMCO Group, Author: unknown, pp. 1-24.

ADEMCO Group, via-30+, Vista 10, 4111XM Security System User's Manual, Jul. 1994, ADEMCO Group, Author: unknown, pp. 1-44.

ADEMCO Group, via-30Pse Security System Programming Guide, Apr. 1997, ADEMCO Group, Author: unknown, pp. 1-24.

ADEMCO Group, via-30PSE, Vista-1SE Security System User's Manual, Jan. 1997, ADEMCO Group, Author: unknown, pp. 1-88.

ADEMCO Group, Vista 4120XM and 4140XMP Security System User's Manual, Jan. 1994, ADEMCO Group, Author: unknown, pp. 1-60.

ADEMCO Group, Vista 4130XT Security System Installation Instructions, Oct. 1998, ADEMCO Group, Author: unknown, pp. 1-84.

ADEMCO Group, Vista 4140XMPT2 Partitioned Security System with Scheduling Installation Instructions, May 1993, ADEMCO Group, Author: unknown, pp. 1-68.

ADEMCO Group, Vista AT 4140 Security System Installation Instructions, Sep. 1998, ADEMCO Group, Author: unknown, pp. 1-68.

ADEMCO Group, Vista Series 4120EC Security System User's Manual, Sep. 1992, ADEMCO Group, Author: unknown, pp. 1-28.

ADEMCO Group, Vista Series 4130XM, 5130XM, 4140XMP Security System User's Manual, Feb. 1992, ADEMCO Group, Author: unknown, pp. 1-32.

ADEMCO Group, Vista Series 4140XMPT/4140XMPT-UL Partitioned Security System User's Manual, Jun. 1993, ADEMCO Group, Author: unknown, pp. 1-32.

ADEMCO Group, Vista Series 4140XMP, Installation Instructions, Jan. 1992, ADEMCO Group, Author: unknown, pp. 1-52.

ADEMCO Group, Vista Series 5140XM User's Manual, Aug. 1992, ADEMCO Group, Author: unknown, pp. 1-28.

ADEMCO Group, Vista XM Series 4140XM, 5130XM, 4130XM, Installation Instructions, Jul. 1990, ADEMCO Group, Author: unknown, pp. 1-26.

ADEMCO Group, Vista XM Series, Installation Instructions, ADEMCO Group, Author: unknown, Oct. 1991, pp. 1-16.

ADEMCO Group, Vista-10 Security System, Installation Instructions, Sep. 1994, ADEMCO Group, Author: unknown, pp. 1-56.

ADEMCO Group, Vista-100 Commercial Fire & Burglary Alarm Partitioned Security System with Scheduling, Installation Instructions and Programming Guide, Jan. 1998, ADEMCO Group, Author: unknown, pp. 1-233.

ADEMCO Group, Vista-100 Commercial Fire & Burglary Alarm System User's Manual, Nov. 1995, ADEMCO Group, Author: unknown, pp. 1-66.

ADEMCO Group, Vista-100 Commercial Fire & Burglary Alarm System with Scheduling Quick Start, Apr. 1996, ADEMCO Group, Author: unknown, pp. 1-24.

ADEMCO Group, Vista-10SE Security System, Installation Instructions, May 1997, ADEMCO Group, Author: unknown, pp. 1-88.

ADEMCO Group, Vista-128B Commercial Burglary Partitioned Security System with Scheduling, Installation and Setup Guide, Jul. 1998, ADEMCO Group, Author: unknown, pp. 1-252.

ADEMCO Group, Vista-128FB Commercial Fire and Burglary Partioned Security System with Scheduling, Installation, and Setup Guide, Oct. 1998, ADEMCO Group, Author: unknown, pp. 1-220.

ADEMCO Group, Vista-128FB Commercial Fire and Burglary Partitioned Security System User Guide, Oct. 1998, ADEMCO Group, Author: unknown, pp. 1-80.

ADEMCO Group, Vista-20 2-Partitioned Security System, Installation Instructions, Nov. 1995, ADEMCO Group, Author: unknown, pp. 1-120.

ADEMCO Group, Vista-20 2-Partitioned Security System, Programming Form, Apr. 1996, ADEMCO Group, Author: unknown, pp. 1-8.

ADEMCO Group, Vista-20 Security System User's Manual, Apr. 1995, ADEMCO Group, Author: unknown, pp. 1-52.

ADEMCO Group, Vista-20HW 2-Partitioned Security System, Installation Instructions, Apr. 1996, ADEMCO Group, Author: unknown, pp. 1-100.

ADEMCO Group, Vista-20HW 2-Partitioned Security System, Programming Form, Apr. 1996, ADEMCO Group, Author: unknown, pp. 1-8.

ADEMCO Group, Vista-20HWse 2-Partitioned Security System, Installation Instructions, Aug. 1997, ADEMCO Group, Author: unknown, pp. 1-84.

ADEMCO Group, Vista-20HWse 2-Partitioned Security System, Programming Form, Aug. 1997, ADEMCO Group, Author: unknown, pp. 1-8.

ADEMCO Group, Vista-20SE 2-Partitioned Security System, Installation Instructions, Aug. 1997, ADEMCO Group, Author: unknown, pp. 1-100.

ADEMCO Group, Vista-20SE 2-Partitioned Security System, Programming Guide, Aug. 1997, ADEMCO Group, Author: unknown, pp. 1-8.

ADEMCO Group, Vista-20SE/Vista-20HWse Security System User's Manual, Jun. 1997, ADEMCO Group, Author: unknown; pp. 1-52.

ADEMCO Group, Vista-30Pse Security System, Installation Instructions, Apr. 1997, ADEMCO Group, Author: unknown; pp. 1-104.

ADEMCO Group, Vista-40 2-Partition Security System, Installation and Setup Guide, Jul. 1998, ADEMCO Group, Author: unknown; pp. 1-380.

ADEMCO Group, Vista-40 2-Partition Security System, Programming Guide, Jul. 1998, ADEMCO Group, Author: unknown; pp. 1-24.

ADEMCO Group, Vista-40 Programming Guide, Jun. 1997, ADEMCO Group, Author: unknown; available at www.guardianalarms.net pp. 1-20.

ADEMCO Group, Vista-40 Security System User's Guide, Jul. 1998, ADEMCO Group, Author: unknown; pp. 1-60.

ADEMCO Group, Vista-50, Vista 50UL Security System, Nov. 1994, ADEMCO Group, Author: unknown; pp. 1-66.

ADEMCO Group, Vista-50P, Vista-50PUL Partitioned Security System with Scheduling, Installation Instructions and Programming Guide, Oct. 1997, ADEMCO Group, Author: unknown; pp. 1-199.

ADEMCO Group, Vista-50P, Vista-50PUL Security System User's Manual, Jul. 1995, ADEMCO Group, Author: unknown; pp. 1-66.

ADEMCO Group, Vista-50P, Vista-50PUL, Partitioned Security System with Scheduling, Quick Start, Aug. 1995, ADEMCO Group, Author: unknown; pp. 1-28.

ADEMCO Group, Vista5140XM Commercial Fire and Burglary Alarm System Installation Instructions, Jun. 1993, ADEMCO Group, Author: unknown, pp. 1-74.

ADEMCO Group, Vista-AT Security System User's Manual, Sep. 1998, ADEMCO Group, Author: unknown; pp. 1-56.

ADEMCO Group, V-Link Downloading Software User's Guide, Jun. 1994, ADEMCO Group, Author: unknown; available at http://www.guardianalarms.net, pp. 1-126.

ADEMCO Group, V-Plex Security Technology, 1997, ADEMCO Group, Author: unknown, available at http://web.archive.org/web/19990421110527/www.ademco.com/ademco on Mar. 5, 2009, pp. 1-6.

ADEMCO Group, Wireless Transmitters/Receivers: 5700 Wireless Transmitters, 1997, ADEMCO Group, Author: unknown, available at http://web.archive.org/web/19990127120423/www.ademco.com/ademco on Mar. 5, 2009, pp. 1-2.

ADEMCO Group, Wireless Transmitters/Receivers: 5800 Wireless Transmitters, 1997, ADEMCO Group, Author: unknown, available at http://web.archive.org/web/19990218181254/www.ademco/com/ademco on Mar. 5, 2009, pp. 1-2.

ADEMCO Group, Wirelss User Interface Devices, 1997, ADEMCO Group, Author: unknown, available at http://web.archive.org/web/19990421190353/www.ademco.com/ademco on Mar. 5, 2009, pp. 1-4.

ADEMCO Group,Vista Series Partitioned Security Systems Model 4140XMPT Installation Instructions, Feb. 1992, ADEMCO Group, Author: unknown, pp. 1-60.

AES - 7700 Central Station, Installation & Operation Manual, Document 40/0551 u, AES Corporation, Author: unknown, Nov. 2003, pp. 1-40.

AES-IntelliGuard 7470, AES IntelliNet, Author: unknown, Nov. 2003, pp. 1-15.

AES 7000 Smart Central Station InstaCentral Station Installation & Operation Manual, Document No. 40-551, AES IntelliNet, Author: unknown; Nov. 20, 1996, pp. 1-48.

AES 7067 IntelliTap-II Digital Dialer Interface: A Supplemental Alarm Supporting Device, AES IntelliNet, Author: unknown, Aug. 5, 2004, pp. 1-4.

AES 7099 Central Station Installation & Operation Manual, Document No. 40/0050, AES IntelliNet, Author: unknown; 1998, pp. 1-20.

AES 7450 RF Subscriber Unit Installation Manual, AES IntelliNet, Author: unknown, 1998, pp. 1-8.

AES 7750-F RF Smart Subscriber Unit Version 2, Including 7750-F-4x4 and 7750-F-8, Installation & Operation Manual, AES IntelliNet, Author: unknown, Apr. 2001 (Updated Nov. 2003), pp. 1-60.

AES 7750-F RF Smart Subscriber Unit Version 2, Installation & Operation Manual, AES IntelliNet, Author: unknown, Aug. 2000, pp. 1-30.

AES Central Alarm Monitoring, Author: unknown, available at http://web.archive.org/web/19990225163745/www.aes-intellinet.com/ae, on Mar. 5, 2009, pp. 1-3.

AES IntelliNet 7450 Addendum, AES Corporation, Author: unknown, Jul. 9, 2002, pp. 1-2.

AES IntelliNet Dealer's List by State, Author: unknown, available at http://web.archive.org/web/200102162324026/www.aes-intellinet.com/list on Mar. 5, 2009, pp. 1-13.

AES IntelliNet Model 7003 Central Station, Installation & Operation Manual, AES IntelliNet, Author: unknown, Jan. 9, 2001, available at http://www.guardianalarms.net, pp. 1-25.

AES IntelliNet Model 7050, 7750, Subscriber Unit, Version 1.62, Installation & Operation Manual, AES IntelliNet, Author: unknown, Dec. 1996, available at www.guardianalarms.net, pp. 1-110.

MacGregor et al., "Multiple Control Stations in Packet Radio Networks", Bolt, Beranek and Newman, Inc., Cambridge, MA, IEEE 1982, pp. 10.3-1-10.3-5, 1982.

Mak et al., "Design Considerations for Implementation of Large Scale Automatic Meter Reading Systems," IEEE Transactions on Power Delivery, vol. 10, No. 1, Jan. 1995, pp. 97-103.

Malkin, "RFC 2453, RIP Version 2 (Nov. 1998)," available at http://tools.ietf.org/html/rfc2453, Jun. 24, 2009, pp. 1-40.

Maltz et al., "Experiences Designing and Building a Multi-Hop Wireless Ad Hoc Network Testbed", School of Computer Science, Carnegie Mellon University, pp. 1-22, Mar. 5, 1999.

Maltz, "On-Demand Routing in Multi-Hop Wireless Mobile Ad Hoc Networks," Thesis, May 2001, pp. 1-192.

Markie et al., "LonWorks and PC/104: A winning combination," PC/104 Embedded Solutions, Summer 1998, pp. 1-8.

Martel et al., "Home Automation Report: A Modular Minimum Complexity, High-Resolution and Low CostField Device Implementation for Home Automation and Healthcare," MIT; Publisher: unknown; Mar. 31, 1998; pp. 1-29.

McQuillan et al., "The ARPA Network Design Decisions," Computer Networks, vol. 1, No. 5, Aug. 1977 pp. 243-289.

McQuillan et al., "The New Routing Algorithm for the ARPANET," IEEE Transactions on Communications, vol. COM-28, No. 5, May 1980, pp. 711-719.

Mills, "Exterior Gateway Protocol Formal Specification" (Apr. 1984), RFC 904, available at http://tools.ietf.org/html/rfc904, Jun. 24, 2009, pp. 1-32.

Moorman, "Packet Radio Used in a Cost-Effective Automated Weather Meso-Net," available at http://www.wrh.noaa.gov/wrh/96TAs/TA963 1/ta96-31.html, Dec. 3, 1996 (5 pages).

Moy, "RFC 2328, OSPF Version 2 (Apr. 1998)," available at http://tools.ietf.org/html/rfc2328, Jun. 24, 2009, pp. 1-245.

Mozer et al., "The Neural Network House: An Overview," in L. Niklasson & Boden (eds.), Current trends in connectionism (pp. 371-380); Hillsdale: Erlbaun, 1995; pp. 1-9.

Murthy et al., "An Efficient Routing Protocol for Wireless Networks, Mobile Networks and Applications 1," (1996), pp. 183-197.

Negus et al., "HomeRFTM and SWAP: Wireless Networking for the Connected Home," ACM SIGMOBILE Mobile Computing and Communications Review, vol. 2, Issue 4, Oct. 1998, available at http://portal.acm.org/citation.cfm?id=1321400.1321401 on Mar. 29, 2009, pp. 1-2.

Nextgen Searches, "*IPCO v. The Wireless Sensor Network Industry*? Special Report on *IPCO v. Oncor et al.*," Corporate Manager's Edition, 2009, pp. 1-16.

Nilsen et al., "Storage Monitoring Systems for the Year 2000," Dept. Of Energy, Office of Scientific and Technical Information, Report No. SAND—97-8532C, available at http://www.osti.gov/bridge/product.biblio.jsp?query_id=3&,page=0&osti_id=303988 (1997).

Ondo, "PLRS/JTIDS Hybrid," Filled Artillery Journal, Jan.-Feb. 1981, pp. 20-25.

Oran (ed.), "OSI IS-IS Intra-Domain Routing Protocol," RFC 1142 (Feb. 1990), available at http://tools.ietf.org/html/rfc1142, Jun. 24, 2009, pp. 1-665.

Park et al., "SensorSim: a Simulation Framework for Sensor Networks," ACM, 2000, pp. 104-111.

Perkins et al., "Ad-Hoc On-Demand Distance Vector Routing "AODV"," http://moment.cs.ucsb.edu/A0DV/aodv.html, Aug. 25, 2009, pp. 1-5.

Perkins et al., "Continuous, transparent network access for portable users, A Mobile Networking System Based on Internet Protocol," IEEE Personal Communications, First Quarter 1994, pp. 32-41.

Perkins et al., "Highly Dynamic Destination-Sequenced Distance-Vector Routing (DSDV) for Mobile Computers," SIGCOM Conference on Communications Architectures, Protocols ans Applications, London England UK (Aug. 1994); pp. 234-244.

Perkins et al., "Mobility Support in IPv6," Internet Draft (Sep. 22, 1994), available at http://www.monarch.cs.rice.edu/internet-draft/draft-perkins-ipv6-mobility-sup-oo.txt., Sep. 26, 2009, pp. 1-13.

Perkins et al., "RFC3561—Ad Hoc On-Demand Distance Vector (AODV) Routing (Jul. 2003)," available at http://tools.ietf.org/html?rfc 3561, Aug. 25, 2009, pp. 1-38.

Pittway Corporation, "Company History," available at http://www.fundinguniverse.com/company-histories/Pittway-Corporation Mar. 6, 2009, pp. 1-5.

Plaintiffs' Opening Markman Brief in Support of Their Proposed Claim Constructions, filed by the patent owner and its co-plaintiff in *SIPCO LLC et al. v. The Toro Co. et al.*, Case No. 2:08-cv-00505-TJS (E.D. Pa.) filed on Sep. 26, 2008.

Pleading - Defendant DIGI International Inc.'s First Amended Answer and Defenses of *SIPCO, LLC v. CONTROL4 Corporation et al.*, Civil Action No. 6:10-cv-249, currently pending in the U.S. District Court for the Eastern District of Texas, Tyler Division, filed Nov. 22, 2010, pp. 1-27.

Pleading - Defendant Siemens Industry, Inc.'s First Amended Answer and Defenses of *SIPCO, LLC v. CONTROL4 Corporation et al.*, Civil Action No. 6:10-cv-249, currently pending in the U.S. District Court for the Eastern District of Texas, Tyler Division, filed Nov. 22, 2010, pp. 1-27.

Poor, Robert D., "Hyphos: A Self-Organizing, Wireless Network," Massachusetts Institute of Technology (Jun. 1997).

Postel (ed.), "Transmission Control Protocol, Version 4," RFC793, available at http://www.faqs.org/rfcs/rfc793.html, Sep. 1981, pp. 1-85.

Postel (Editor), "Internet Protocol, DARPA Internet Program Protocol Specification," RFC 791 (Sep. 1981), Information Sciences Institute, University of So. Cal., pp. 1-45.

Pottie et al., "Adaptive Wireless Arrays Interactive Recconaissance, Surveillance, and Target Acquisition in Small Unit Operations (AWAIRS); Lower Power Wireless Integrated Microsensors (LWIM)," Presented to Dr. E. Carapezza, Dr. D. Lao and Lt. Col. J. Hernandez, UCLA, Rockwell Science Center; Mar. 21, 1997, pp. 1-110.

Pottie et al., "Wireless Integrated Network Sensors," Communications of the ACM, vol. 43, No. 5, May 2000, pp. 51-58.

Pottie et al., "Wireless Integrated Network Sensors: Towards Low Cost and Robust Self-Organizing Security Networks;" EED, UCLA; Rockwell Science Center; SPIE vol. 3577, Nov. 1, 1998, pp. 86-95.

Pottie, "AWAIRS: Mini-Site Review, Project Status," UCLA: Rockwell Science Center, Feb. 23, 1998, pp. 1-58.

Pottie, "Hierarchical Information Processing in Distributed Sensor Networks," ISIT, Aug. 16-21, 1998, IEEE, 1998, pp. 163;.

Pottie, "R&D Quarterly and Annual Status Report," SPAWAR (contractor), Apr. 31, 1999.

Pottie, "Wireless Sensor Networks," ITW 1998, Jun. 22-26, 1998, available at http://dantzig.ee.ucla.edu/oclab/Pottie.html, 2 pages.

Rabaey et al., "PicoRadio Support Ad Hoc Ultra-Low Power Wireless Networking," Computer, IEEE, Jul. 2000, pp. 42-48.

Radlherr, "Datentransfer Ohne Draht und Telefon," Funkschau, Nov. 1991, pp. 49-52.

Raji, "Control Networks and the Internet, Rev. 2.0," Echelon Corp., 1998, pp. 1-39.

Raji, "End-to-End Solutions with LonWorks® Control Technology: Any Point, Any Time, Any Where," Echelon Corp.;, 1998, pp. 1-30.

Raji, "Control Networks and the Internet," Echelon Corp., Rev. 2.0, available at http://www.echelon.com/solutions/opensystems/papers/Control_in ternet.pdf (1998).

Rants and Ramblings, "Go Wireless . . . At a Payphone," May 10, 2003, http://www.morethanthis.net/blog/archives/2003/05/10/000301.html (2 pages).

Nunavut et al., Web Based Remote Security System (WRSS) Model Development, IEEE, Apr. 7-9, 2000, pp. 379-382.

X10, "CK11A ActiveHome, Home Automation System, Owner's Manual," Oct. 23, 1997, pp. 1-56.

X10.com: The Supersite for Home Automation, "What's in the Kit," available at http://web.archive.org/web/19991111133453/www.com/products/x, on Mar. 2, 2009, pp. 1-2.

X10.com: The Supersite for Home Automation, "Wireless Remote Control System (RC5000)," available at http://web.archive.org/web/1999111453227/www.x10.com/products/x1 on Mar. 2, 2009, pp. 1.

X10: The Supersite for Home Automation, "Transceiver Module," available at http://web.archive.org/web/20000229141517/www.x10.com/products/x on Mar. 2, 2009, pp. 1.

Xecom Incorporated, "EX900S Smart Spread Spectrum Transceiver," Nov. 2003 (13 pages).

Young, "USAP: A Unifying Dynamic Distributed Mulitchannel TDMA Slot Assignment Protocol," Rockwell International Communication Systems Division, IEEE (1996).

Yu, "Target Identification Processor for Wireless Sensor Network," Dissertation, Los Angeles: University of California, 1999, pp. 1-110.

Zander et al., "The SOFTNET Project: A Retrospect," 1988 IEEE, pp. 343-345.

Zich et al., "Distribution, Networks, and Networking: Options for Dissemination", Workshop on Electronic Texts Session III, http://palimpsets.stanford.edu/byorg/lc/etextw/sess3.html, pp. 1-10, Accessed Jul. 17, 2007.

Kahn et al., Advances in Packet Radio Technology, Proceedings of the IEEE, vol. 66, No. 11, pp. 1468-1496 (Nov. 1978).

Agre et al., "Development Platform for Self-Organizing Wireless Sensor Networks," Rockwell Science Center and UCLA, Date:Apr. 1999, pp. 257-268.

Kahn, "The Organization of Computer Resources into a Packet Radio Network," IEEE, Jan. 1977, vol. Com-25 No. 1, pp. 169-178.

Rosen, "Exterior Gateway Protocol (EGP)," Bolt Beranek and Newman Inc., Oct. 1982, pp. 1-48.

ADEMCO Group, Control/Communicator 5110XM Installation Instructions, Apr. 1996, ADEMCO Group, Author: unknown, pp. 1-76.

ADEMCO Group, Vista-128FB Commercial Fire and Burglary Partitioned Security System Quick Start Guide, Oct. 1998, ADEMCO Group, Author: unknown, pp. 1-68.

Brain, "How Motes Work: A Typical Mote," available at http://computer.howstuffworks.com/mote4.htm, on Feb. 25, 2010, pp. 1-2.

* cited by examiner

FIG. 11       Message Structure

| To Addr. (1-6) | From Addr. (6) | Pkt. No. (1) | Pkt. Max. (1) | Pkt. Lngth. (1) | Cmd. (1) | Data (0-238) | CkH (1) | CkL (1) |
|---|---|---|---|---|---|---|---|---|

The order of appearance remains fixed although byte position number in each packet may vary due to one or more of the following reasons:
1. Scalability of the "TO ADDRESS" (1 to 6 Bytes).
2. The CMD Byte.
3. Scalability of the Data portion of the message (0 to 238 Bytes).

"To Address" Byte Assignment:

| | |
|---|---|
| MSB - Byte 1<br>Device Type | FF-F0 (16) - Broadcast All Devices (1 Byte Address)<br>EF-1F (224) - Device Type Base (2 to 6 Byte Address)<br>0F-00 (16) - Personal Transceiver Identification (6 Byte Address) |
| Byte 2<br>Mfg./Owner ID | FF-F0 (16) - Broadcast all Devices (Byte 1 Type)<br>(2 Byte Broadcast Address)<br>EF-00 (240) - Mfg./Owner Code Identification Number |
| Byte 3<br>Mfg./Owner<br>Extension ID | FF-F0 (16) - Broadcast all Devices (Byte 1 & Byte 2 Type)<br>(3 Byte Broadcast Address)<br>EF-00 (240) - Device Type/Mfg./Owner Code ID Number |
| Byte 4 | FF-F0 (16) - Broadcast all Devices (Byte 1 & Byte 2 Type)<br>(4 Byte Broadcast Address)<br>EF-00 (240) - ID Number |
| Byte 5 | (FF-00) 256 - Identification Number |
| Byte 6 | (FF-00) 256 - Identification Number |

"From Address" Byte Assignment:

| | |
|---|---|
| From Address | (FF-00) Full "ID" of Originating Device (up to 6 Bytes) |
| Packet Number | (FF-00) Packet Number of Msg. longer than 256 Bytes |
| Packet Max. | (FF-00) Number of Packets in Message over 256 Bytes |
| Packet Length | (FF-00) Length (in Bytes) of Packet/Message Transmission* |
| Command | (FF-00) Command Byte |
| Data | (FF-00) Data as required by specific command |
| ChkH | (FF-00) Packet Checksum, High Byte |
| ChkL | (FF-00) Packet Checksum, Low Byte |

* Packet Length - 13 Bytes (Min.) / 256 Bytes (Max.)

Sample Messages

Central Server to Personal Transceiver - Broadcast Message - FF (Emergency)

Byte Count = 12

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency)

Byte Count = 17

| To Addr. (F0) | From Addr. (12345678) | Pkt. No. (00) | Pkt. Max. (00) | Pkt. Lngth. (11) | Cmd. (FF) | Data (A000123456) | CkH (03) | CkL (A0) |
|---|---|---|---|---|---|---|---|---|

Note: Additional Transceiver Re-Broadcasts do not change the message.
The messages are simply received and re-broadcast.

---

Message to Device "A0" From Device "E1"  Command - "08" (Respond to PING)
Response will reverse "To" and "From" Addresses Byte Count = 17

| To Addr. (A012345678) | From Addr. (E112345678) | P # (00) | P Max. (00) | P Lngth. (11) | Cmd. (08) | Data (A5) | CkH (04) | CkL (67) |
|---|---|---|---|---|---|---|---|---|

FIG. 12

SYSTEMS AND METHODS FOR REMOTE IRRIGATION CONTROL

CROSS REFERENCE TO RELATED APPLICATIONS & PRIORITY CLAIMS

This application is a continuation of copending U.S. patent application Ser. No. 12/477,329, entitled, "Systems and Methods for Monitoring and Controlling Remote Devices," filed on Jun. 3, 2009; which is a continuation of U.S. patent application Ser. No. 12/337,739, entitled System and Method for Monitoring and Controlling Remote Devices and filed on 18 Dec. 2008; which is a continuation of U.S. patent application Ser. No. 11/395,685, entitled, "System and Method for Monitoring and Controlling Remote Devices," filed on Mar. 31, 2006, issued as U.S. Pat. No. 7,468,661; which is a continuation of U.S. patent application Ser. No. 10/139,492, entitled, "System and Method for Monitoring and Controlling Remote Devices," filed on May 6, 2002 and now U.S. Pat. No. 7,053,767; which is a continuation of U.S. patent application Ser. No. 09/439,059, filed on Nov. 12, 1999 and entitled "System and Method for Monitoring and Controlling Remote Devices," now U.S. Pat. No. 6,437,692. U.S. Pat. No. 6,437,692 is a continuation-in-part of U.S. patent application Ser. No. 09/271,517, filed Mar. 18, 1999 and entitled, "System for Monitoring Conditions in a Residential Living Community", which is a continuation-in-part of U.S. patent application Ser. No. 09/102,178 filed Jun. 22, 1998 and entitled, "Multi-Function General Purpose Transceiver," now U.S. Pat. No. 6,430,268, which is a continuation-in-part of U.S. patent application Ser. No. 09/412,895, filed Oct. 5, 1999 and entitled, "System and Method for Monitoring the Light Level Around an ATM," now U.S. Pat. No. 6,218,953; which is a continuation-in-part of U.S. patent application Ser. No. 09/172,554, filed Oct. 14, 1998 and entitled, "System for Monitoring the Light Level Around an ATM," now U.S. Pat. No. 6,028,522; and further claims the benefit of U.S. Provisional Application Ser. No. 60/146,817, filed Aug. 2, 1999 and entitled, "System and Method for Monitoring and Controlling Residential Devices." Each of the above identified applications and patents are incorporated herein by reference in their entireties.

TECHNICAL FIELD

Embodiments of the present invention generally relate to remotely operated systems, and more particularly to a computerized system for monitoring, reporting on, and controlling remote systems by transferring information signals through a wide area network (WAN) and using software applications hosted on a connected server to appropriately process the information.

BACKGROUND

As is known, there are a variety of systems for monitoring and controlling manufacturing processes, inventory systems, emergency control systems, and the like. Most automatic systems use remote sensors and controllers to monitor and automatically respond to system parameters to reach desired results. A number of control systems utilize computers to process system inputs, model system responses, and control actuators to implement process corrections within the system. Both the electric power generation and metallurgical processing industries have had success controlling production processes by implementing computer controlled control systems in individual plants.

One way to classify control systems is by the timing involved between subsequent monitoring occurrences. Monitoring processes can be classified as aperiodic or random, periodic, and real-time. A number of remotely distributed service industries implement the monitoring and controlling process steps through manual inspection and intervention.

A periodic monitoring systems (those that do not operate on a predetermined cycle) are inherently inefficient as they require a service technician to physically traverse an area to record data, repair out of order equipment, add inventory to a vending machine, and the like. Such service trips are carried out in a number of industries with the associated costs being transferred to the consumers of the service.

Conversely, utility meter monitoring, recording, and client billing are representative of a periodic monitoring system. In the past, utility providers sent a technician from meter to meter on a periodic basis to verify meter operation and to record utility use. One method of cutting operating expenses in the utility industry involved increasing the period at which manual monitoring and meter data recording was performed. While this method decreased the monitoring and recording expense associated with more frequent meter observation and was convenient for consumers who favor the consistent billed amounts associated with "budget billing," the utility provider retained the costs associated with less frequent meter readings and the processing costs associated with reconciling consumer accounts.

Lastly, a number of environmental and safety systems require constant or real-time monitoring. Heating, ventilation, and air-conditioning systems, fire reporting and damage control systems, alarm systems, and access control systems are representative systems that utilize real-time monitoring and often require immediate feedback and control. These real-time systems have been the target of control systems theory and application thereof for some time.

A problem with expanding the use of control systems technology to distributed systems are the costs associated with the sensor-actuator infrastructure required to monitor and control functions within such systems. The typical approach to implementing control system technology is to install a local network of hard-wired sensors and actuators along with a local controller. Not only is there expense associated with developing and installing appropriate sensors and actuators but the added expense of connecting functional sensors and controllers with the local controller. Another prohibitive cost associated with applying control systems technology to distributed systems is the installation and operational expense associated with the local controller.

Accordingly, an alternative solution to applying monitoring and control system solutions to distributed systems that overcomes the shortcomings of the prior art is desired.

SUMMARY OF EXEMPLARY EMBODIMENTS

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a cost effective method of monitoring and controlling remote devices. More specifically, the present invention is directed to a computerized system for monitoring, reporting, and controlling remote systems and system information transfer by transmitting information signals to a WAN gateway interface and using applications on a connected server to process the information. Because the applications server is integrated on a WAN, Web browsers can be used by anyone with Internet access (and the appropriate access permissions) to view and download the recorded data.

In accordance with a broad aspect of the invention, a system is provided having one or more sensors to be read and/or actuators to be controlled remotely, ultimately through a computer on the Internet. The sensors and/or actuators are interfaced with wireless transceivers that transmit and/or receive data to and from the Internet. In this regard, additional wireless transceivers may relay information between the transceivers disposed in connection with the sensors and actuators and a gateway to the Internet. It should be appreciated that, a portion of the information communicated includes data that uniquely identifies the sensors and/or actuators.

In accordance with one aspect of the invention, a system is configured to monitor and report system parameters. The system is implemented by using a plurality of wireless transceivers. At least one wireless transceiver is interfaced with a sensor, transducer, actuator or some other device associated with the application parameter of interest. In this regard, the term "parameter" is broadly construed and may include, but is not limited to, a system alarm condition, a system process variable, an operational condition, etc. The system also includes a plurality of transceivers that act as signal repeaters that are dispersed throughout the nearby geographic region at defined locations. By defined locations, it is meant only that the location of each transceiver is known to a central computer. The central computer may be informed of transceiver physical locations after permanent installation, as the installation location of the transceivers is not limited. Each transceiver that serves to repeat a previously generated data signal may be further integrated with its own unique sensor or a sensor actuator combination as required. Additional transceivers may be configured as stand-alone devices that serve to simply receive, format, and further transmit system data signals. Further, the system includes a local data formatter that is configured to receive information communicated from the transceivers, format the data, and forward the data via the gateway to one or more servers interconnected with the WAN. The server further includes means for evaluating the received information and identifying the system parameter and the originating location of the parameter. The server also includes means for updating a database or further processing the reported parameters.

Consistent with the broader concepts of the invention, the "means" for evaluating the received information and the "means" for reporting system parameters are not limited to a particular embodiment or configuration. Preferably, these "means" will be implemented in software that is executed by a processor within a server integrated with the Internet. However, dedicated WANs or Intranets are suitable backbones for implementing defined system data transfer functions consistent with the invention.

In one embodiment, a client retrieves configured system data by accessing an Internet Web site. In such an embodiment, a system consistent with the present invention acts as a data collector and formatter with data being delivered upon client request, with availability twenty-four hours a day, seven days a week.

In more robust embodiments, a system can be configured to collect, format, and deliver client application specific information on a periodic basis to predetermined client nodes on the WAN. In these embodiments, client intervention would serve to close the feedback loop in the control system.

In yet another embodiment, a system can be configured to collect, format, and control client application specific processes by replacing a local control computer with a WAN interfaced server and integrating system specific actuators with the aforementioned system transceivers.

It should be further appreciated that the information transmitted and received by the wireless transceivers may be further integrated with other data transmission protocols for transmission across telecommunications and computer networks other than the Internet. In addition, it should be further appreciated that telecommunications and computer networks other than the Internet can function as a transmission path between the networked wireless transceivers, the local gateways, and the central server.

In yet a further embodiment, a system can be configured using the present invention to translate and transmit control signals from an existing local controller via the networked wireless transceivers. In this regard, the system of the present invention would require a data translator to tap into the data stream of an existing control system. Distinct control system signals may be mapped to function codes used by the present invention in order to provide customer access to control system data. In this way, the system of the present invention can be integrated with present data collection and system controllers inexpensively, as customers will only have to add a data translator and a wireless transmitter or transceiver as the application demands. By integrating the present invention with the data stream generated by present monitoring and control systems, potential customers enjoy the benefits of the present invention without the difficulties associated with integrating sensors and actuators to monitor individual system parameters.

BRIEF DESCRIPTION OF FIGURES

The accompanying drawings incorporated in and forming a part of the specification, illustrate several aspects of the present invention, and together with the description serve to explain the principles of the invention. In the drawings:

FIG. 11 is a table illustrating the message protocol of the present invention;

FIG. 12 illustrates three sample messages using the message protocol of the present invention;

DETAILED DESCRIPTION OF PREFERRED & ALTERNATIVE EMBODIMENTS

Figure 1:
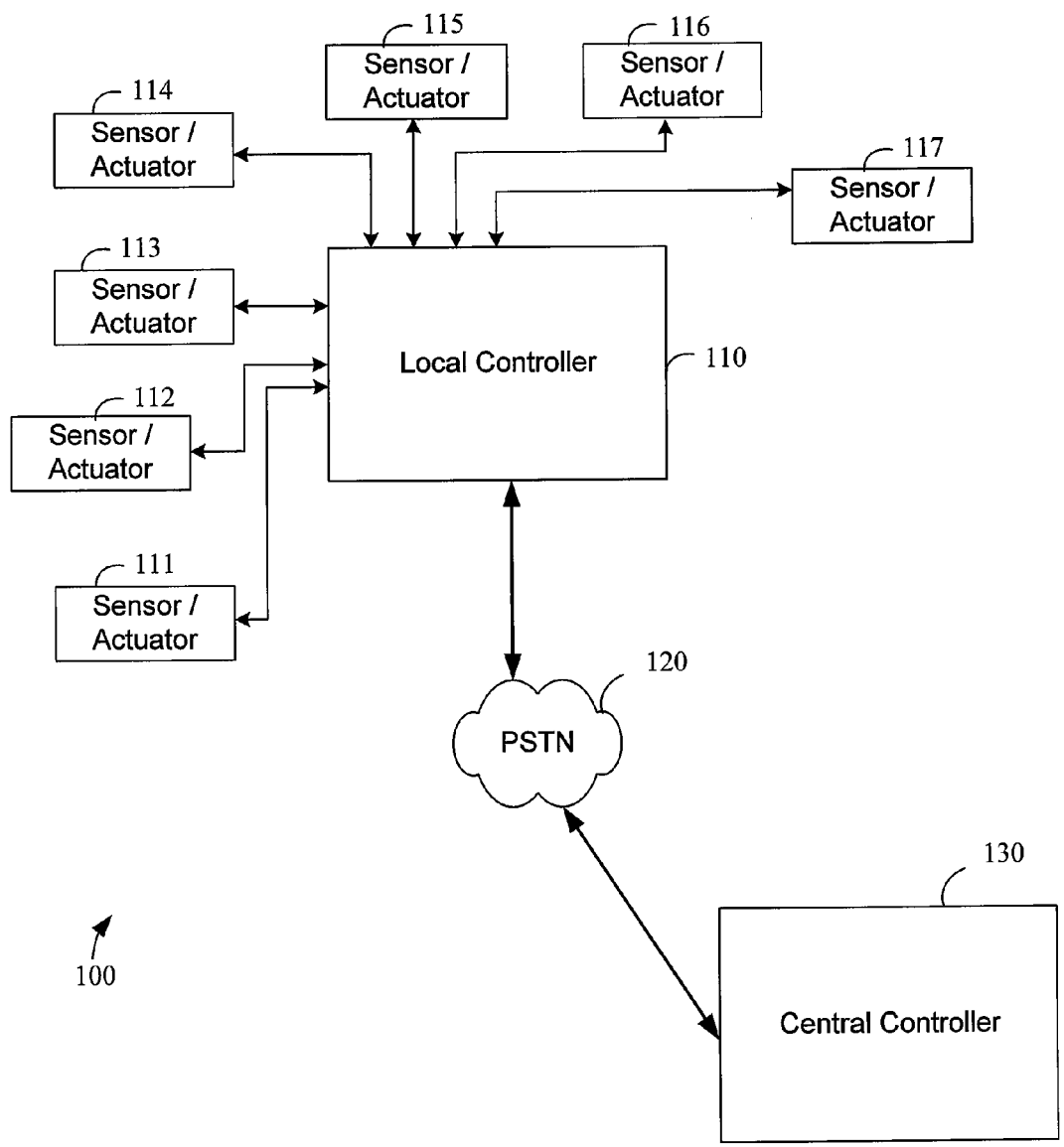
FIG. 1 is a block diagram of a prior art control system.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Referring now to the drawings, reference is made to FIG. 1, which is a block diagram illustrating certain fundamental components of a prior art control system 100. More particularly, a prior art control system 100 includes a plurality of sensor actuators 111, 112, 113, 114, 115, 116, and 117 electrically coupled to a local controller 110. In a manner well known in the art of control systems, local controller 110 provides power, formats and applies data signals from each of the sensors to predetermined process control functions, and returns control signals as appropriate to the system actuators. Often, prior art control systems are further integrated via the public switched telephone network (PSTN) 120 to a central controller 130. Central controller 130 can be further configured to serve as a technician monitoring station or to forward alarm conditions via PSTN 120 to appropriate public safety officers.

Prior art control systems consistent with the design of FIG. 1 require the development and installation of an application-specific local system controller, as well as, the routing of electrical conductors to each sensor and actuator as the application requires. Such prior art control systems are typically augmented with a central controller 130 that may be networked to the local controller 110 via PSTN 120. As a result, prior art control systems often consist of a relatively heavy design and are subject to a single point of failure should local controller 110 go out of service. In addition, these systems require electrical coupling between the local controller and system sensors and actuators. As a result, appropriately wiring an existing industrial plant can be a dangerous and expensive proposition.

Figure 2:
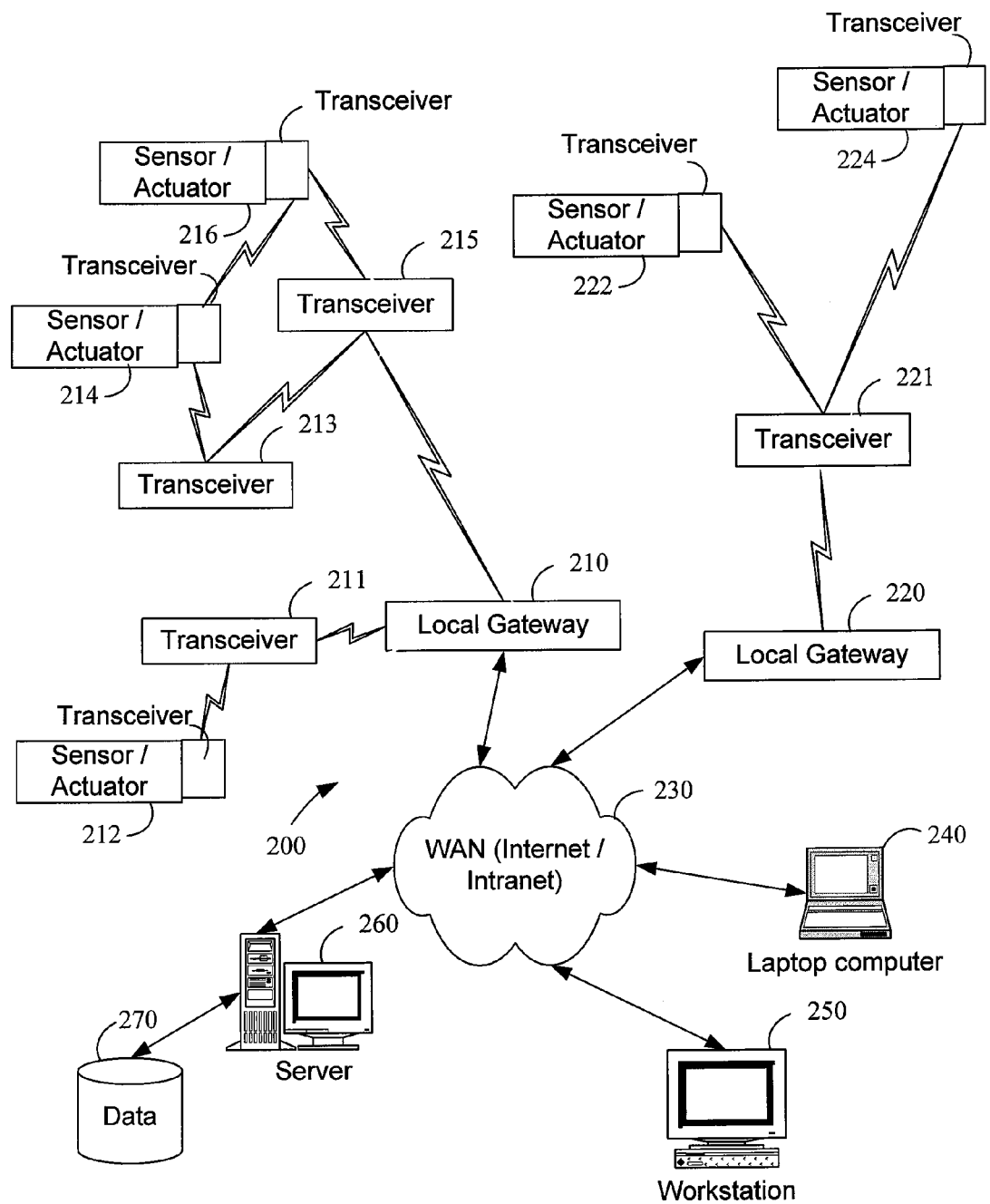
FIG. 2 is a block diagram illustrating a monitoring/control system of the present invention.

Having described a prior art control system and delineated some of its shortcomings, reference is now made to FIG. 2, which is a block diagram that illustrates a control system in accordance with the present invention. Control system 200 consists of one or more sensor/actuators 212, 214, 216, 222, and 224 each integrated with a transceiver. The transceivers are preferably RF (Radio Frequency) transceivers, that are relatively small in size and transmit a relatively low power RF signal. As a result, in some applications, the transmission range of a given transceiver may be relatively limited. As will be appreciated from the description that follows, this relatively limited transmission range of the transceivers is an advantageous and desirable characteristic of control system 200. Although the transceivers are depicted without a user interface such as a keypad, in certain embodiments of the invention the transceivers may be configured with user selectable buttons or an alphanumeric keypad. Often, the transceivers will be electrically interfaced with a sensor or actuator, such as a smoke detector, a thermostat, a security system, etc., where external buttons are not needed.

Control system 200 also includes a plurality of stand-alone transceivers 211, 213, 215, and 221. Each stand-alone transceiver 211, 213, 215, and 221 and each of the integrated transceivers 212, 214, 216, 222, and 224 may be configured to receive an incoming RF transmission (transmitted by a remote transceiver) and to transmit an outgoing signal. This outgoing signal may be another low power RF transmission signal, a higher power RF transmission signal, or alternatively may be transmitted over a conductive wire, fiber optic cable, or other transmission media. The internal architecture of a transceiver integrated with a sensor/actuator 212 and a stand-alone transceiver 211 will be discussed in more detail in connection with FIGS. 3A through 3C. It will be appreciated by those skilled in the art that integrated transceivers 212, 214, 216, 222, and 224 can be replaced by RF transmitters (not shown) for client specific applications that require data collection only.

Local gateways 210 and 220 are configured and disposed to receive remote data transmissions from the various stand-alone transceivers 211, 213, 215, and 221 or integrated transceivers 212, 214, 216, 222, and 224 having an RF signal output level sufficient to adequately transmit a formatted data signal to the gateways. Local gateways 210 and 220 analyze the transmissions received, convert the transmissions into TCP/IP format and further communicate the remote data signal transmissions via WAN 230. In this regard, and as will be further described below, local gateways 210 and 220 may communicate information, service requests, control signals, etc. to remote sensor/actuator transceiver combinations 212, 214, 216, 222, and 224 from server 260, laptop computer 240, and workstation 250 across WAN 230. Server 260 can be further networked with database server 270 to record client specific data.

It will be appreciated by those skilled in the art that if an integrated transceiver (either of 212, 214, 216, 222, and 224) is located sufficiently close to local gateways 210 or 220 such that its RF output signal can be received by a gateway, the RF data signal need not be processed and repeated through stand-alone transceivers 211, 213, 215, or 221.

Figure 6:
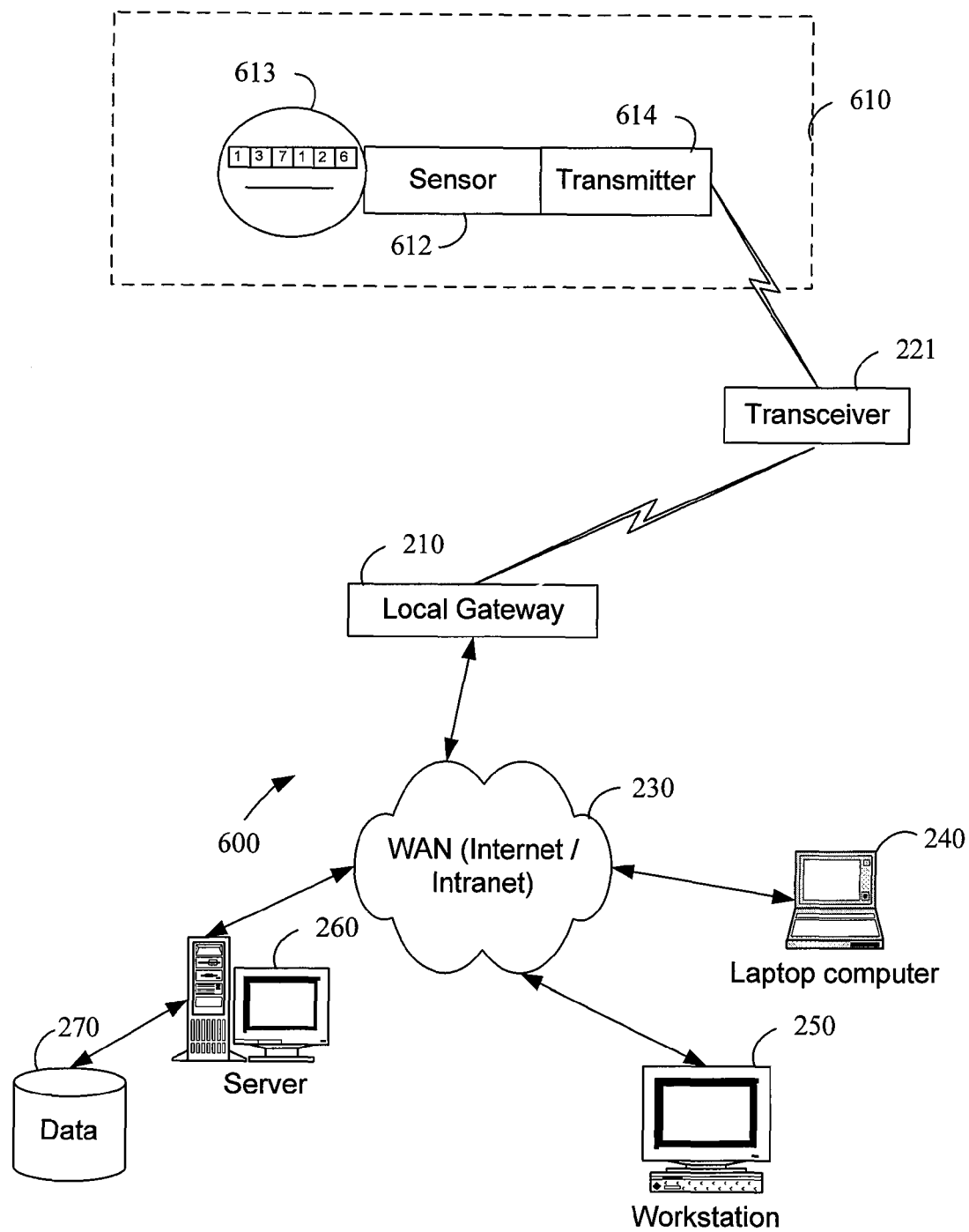
FIG. 6 is a block diagram illustrating a client specific application in accordance with the invention (simple data collection or monitoring)
Figure 7:
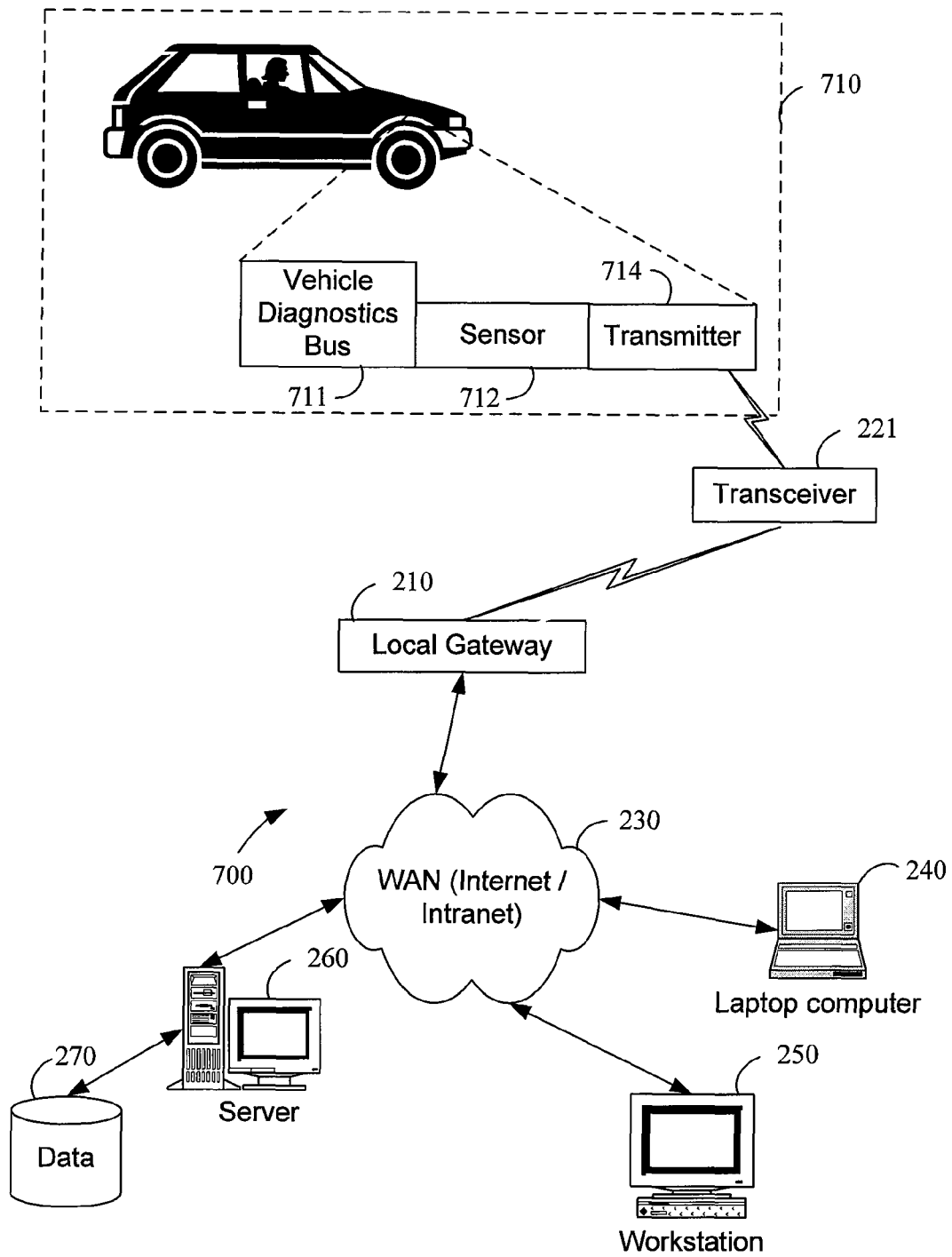
FIG. 7 is a block diagram illustrating another data monitoring and reporting application consistent with the present invention.

It will be further appreciated that a monitoring system constructed in accordance with the teachings of the present invention may be used in a variety of environments. In accordance with a preferred embodiment, a monitoring system such as that illustrated in FIG. 2 may be employed to monitor and record utility usage by residential and industrial customers as illustrated in FIG. 6. Another preferred monitoring system is illustrated in FIG. 7. FIG. 7 depicts the transfer of vehicle diagnostics from an automobile via a RF transceiver integrated with the vehicle diagnostics bus to a local transceiver that further transmits the vehicle information through a local gateway onto a WAN.

Figure 8:
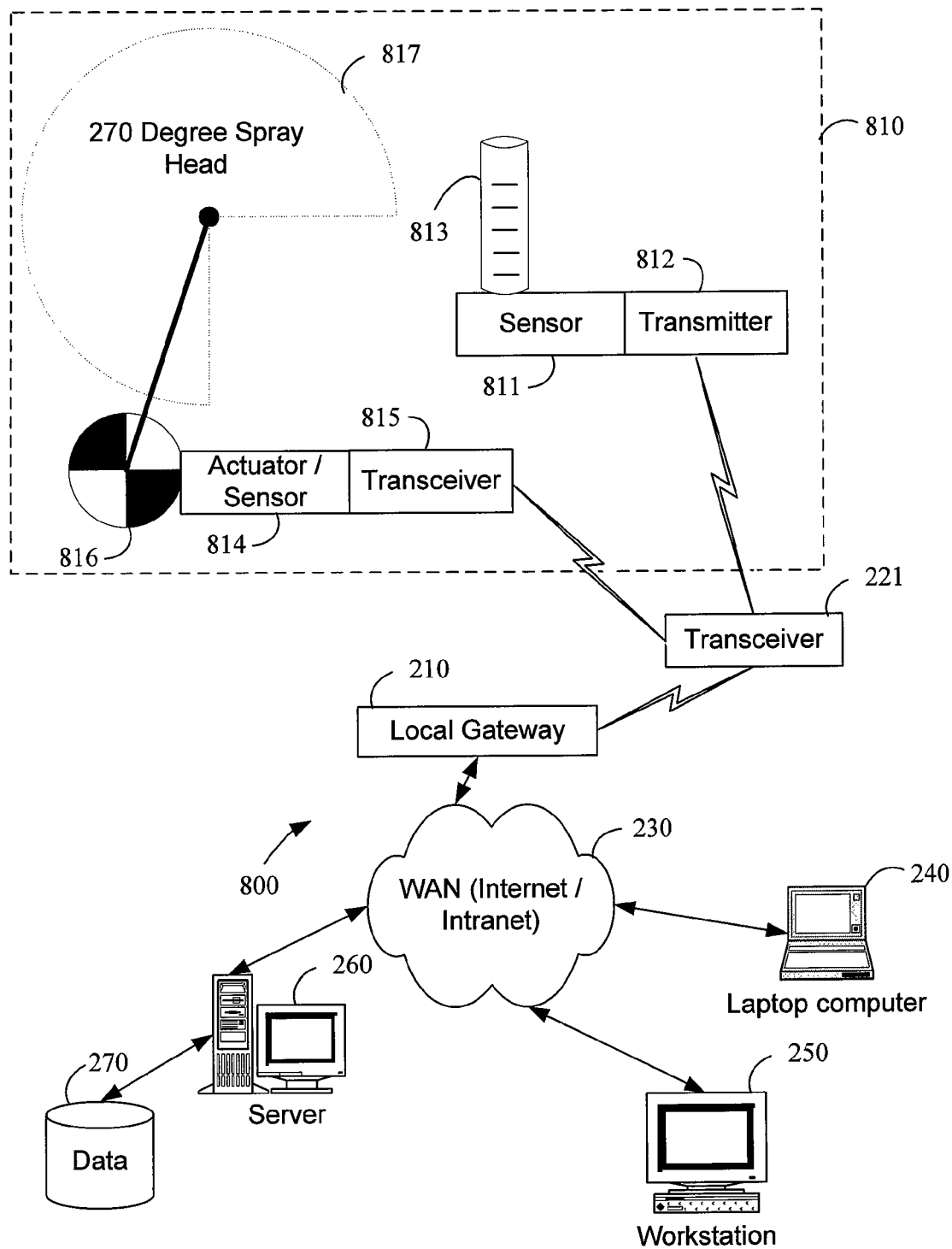
FIG. 8 is a block diagram illustrating a third client specific application in accordance with the invention (monitoring and controlling a process)
Figure 9:
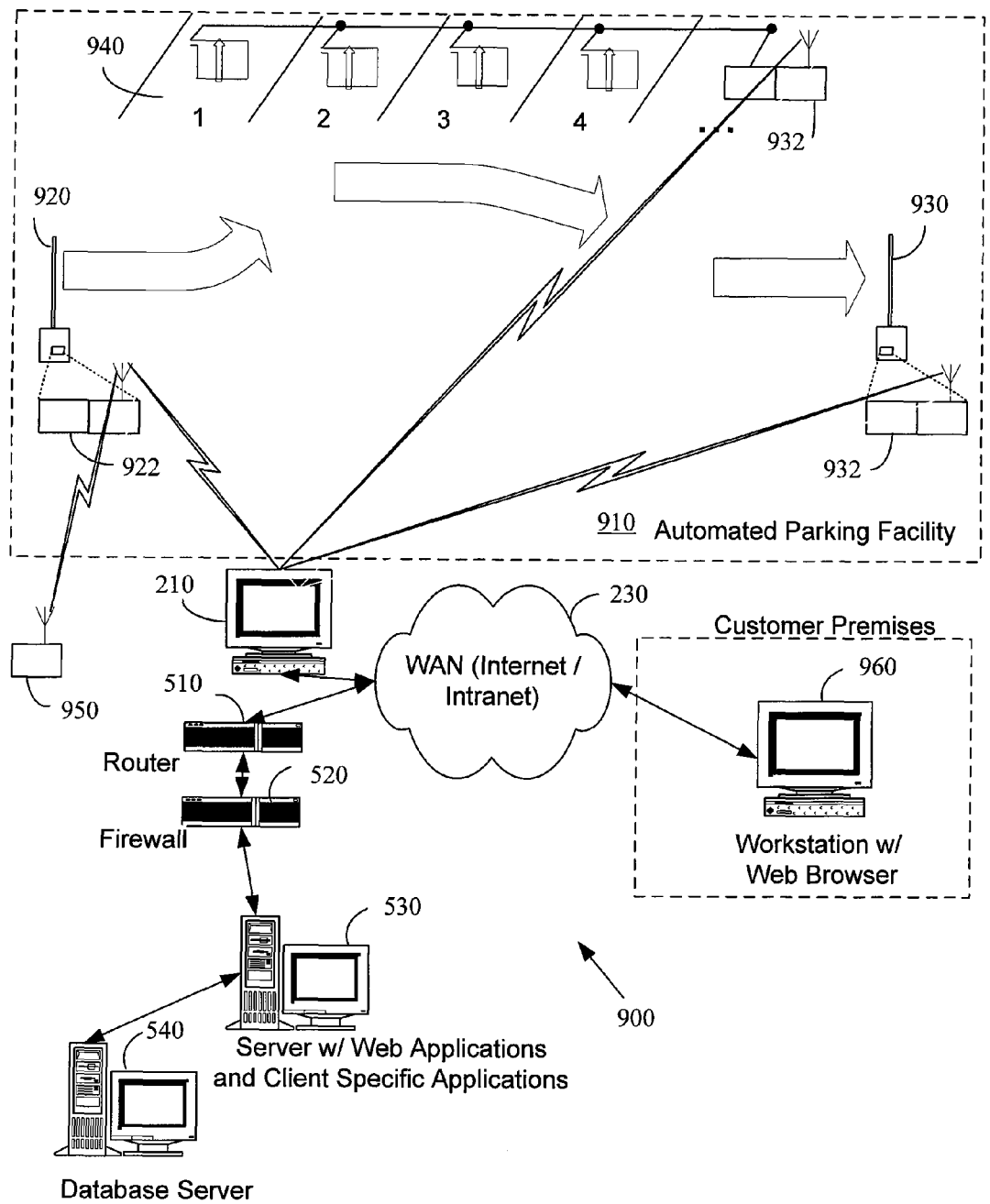
FIG. 9 is a block diagram illustrating the present invention as deployed in a particular business application.

It will be further appreciated that a monitoring and control system consistent with the present invention may be used in a variety of environments. In accordance with a preferred embodiment, a control system such as that illustrated in FIG. 2 may be employed to monitor and control an irrigation system as illustrated in FIG. 8. Another preferred control system is illustrated in FIG. 9. FIG. 9 depicts a business application of a control system wherein the operation of a parking facility may be automated.

As will be further appreciated from the discussion herein, transceivers 212, 214, 216, 222, and 224 may have substantially identical construction (particularly with regard to their internal electronics), which provides a cost effective implementation at the system level. Furthermore, a plurality of stand-alone transceivers 211, 213, 215, and 221, which may be identical, are disposed in such a way that adequate coverage in an industrial plant or community is provided. Preferably, stand-alone transceivers 211, 213, 215, and 221 may be dispersed sufficient that only one stand-alone transceiver will pick up a transmission from a given integrated transceiver 212, 214, 216, 222, and 224 (due in part to the low power transmission nature of each transmitter). However, in certain instances two, or even more, stand-alone transceivers may pick up a single transmission. Thus, the local gateways 210 and 220 may receive multiple versions of the same data transmission signal from an integrated transceiver, but from different stand-alone transceivers. The local gateways 210 and 220 may utilize this information to triangulate, or otherwise more particularly assess the location from which the transmission is originating. Due to the transmitting device identification that is incorporated into the transmitted signal, duplicative transmissions (e.g., transmissions duplicated to more than one gateway, or to the same gateway, more than once) may be ignored or otherwise appropriately handled.

In accordance with the preferred embodiment shown in FIG. 2, integrated transceivers 212, 214, 216, 222, and 224 may be disposed within automobiles (see FIG. 7), a rainfall gauge (see FIG. 8), or a parking lot access gate (see FIG. 9) to monitor vehicle diagnostics, total rainfall and sprinkler supplied water, and access gate position, respectively. The advantage of integrating a transceiver, as opposed to a one-way transmitter, into a monitoring device relates to the ability of the transceiver to receive incoming control signals, as opposed to merely transmitting data signals. Significantly, local gateways 210 and 220 may communicate with all system transceivers. Since local gateways 210 and 220 are permanently integrated with WAN 230, server 260 can host application specific software which was typically hosted in an application specific local controller as shown in FIG. 1. Of further significance, the data monitoring and control devices of the present invention need not be disposed in a permanent location as long as they remain within signal range of a system compatible transceiver that subsequently is within signal range of a local gateway interconnected through one or more networks to server 260. In this regard, small application specific transmitters compatible with control system 200 can be worn or carried about one's person as will be further described below.

In one embodiment, server 260 collects, formats, and stores client specific data from each of the integrated transceivers 212, 214, 216, 222, and 224 for later retrieval or access from workstation 250 or laptop 240. In this regard, workstation 250 or laptop 240 can be used to access the stored information through a Web browser in a manner that is well known in the art. In another embodiment, server 260 may perform the additional functions of hosting application specific control system functions and replacing the local controller by generating required control signals for appropriate distribution via WAN 230 and local gateways 210 and 211 to the system actuators. In a third embodiment, clients may elect for proprietary reasons to host control applications on their own WAN connected workstation. In this regard, database 270 and server 260 may act solely as a data collection and reporting device with client workstation 250 generating control signals for the system.

It will be appreciated by those skilled in the art that the information transmitted and received by the wireless transceivers of the present invention may be further integrated with other data transmission protocols for transmission across telecommunications and computer networks other than the Internet. In addition, it should be further appreciated that telecommunications and computer networks other than the Internet can function as a transmission path between the networked wireless transceivers, the local gateways, and the central server.

Figure 3A:
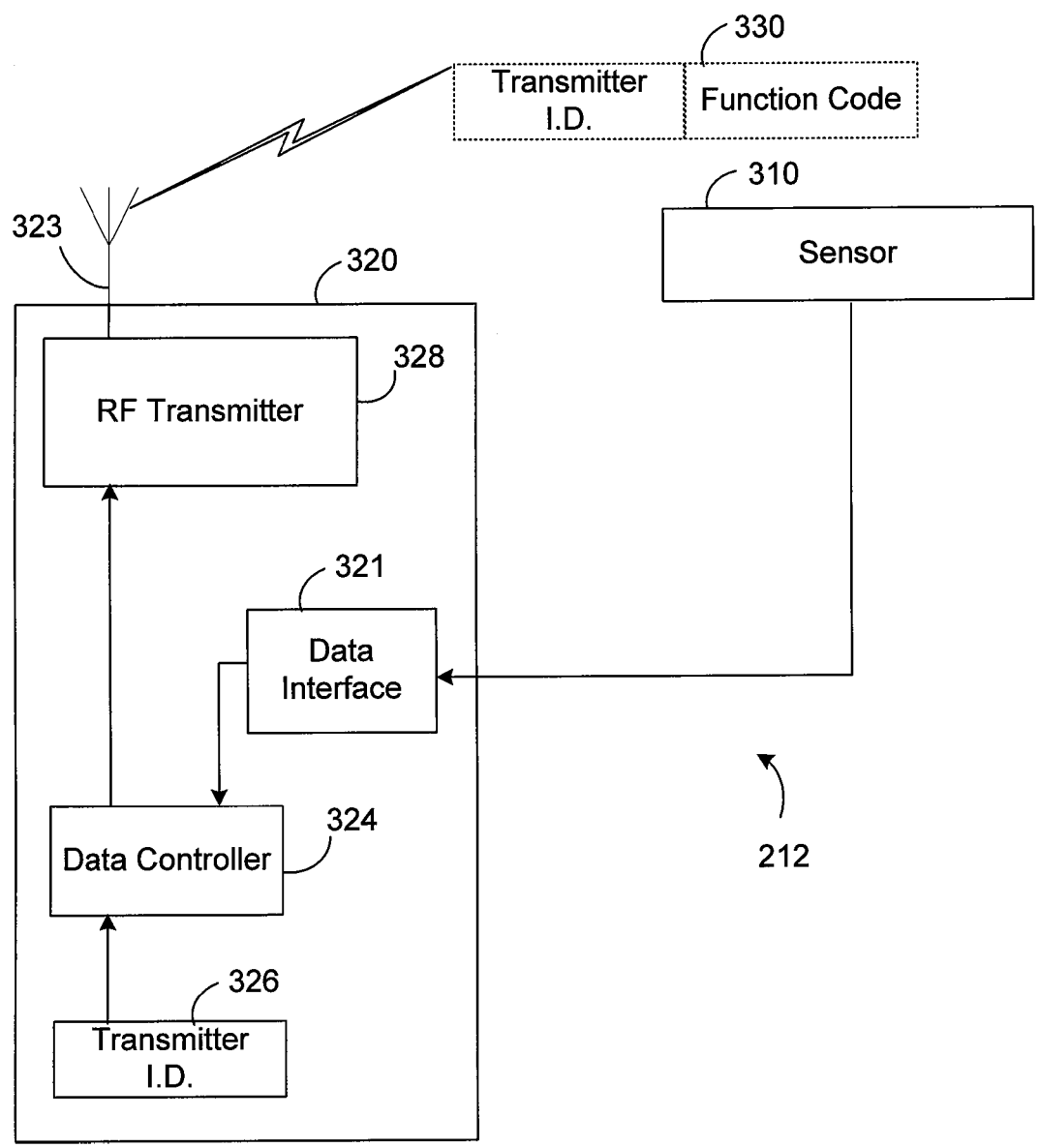
FIG. 3A is a functional block diagram that illustrates a transmitter in accordance with the present invention integrated in a portable device with user operable buttons that trigger data transmissions as desired.

Reference is now made to FIG. 3A, which is a block diagram that illustrates the functional components of a RF transmitter 320, of a type worn or carried by a person, in more detail. Blocks 327 and 329 represent physical buttons, which a user may actuate to cause the RF transmitter 320 to initiate different signal transmissions. In the illustrated embodiment, these include a "transmit" button 327 and a panic or "emergency" button 329. Of course, additional, fewer, or different buttons may be provided on a given transmitter, depending upon the system or implementation desired. Each of these buttons may be electrically wired to a data interface 321 which is configured to receive electrical signals from buttons 327 and 329, and ultimately convey that information to a data formatter 324. In one embodiment, data interface 321 may simply comprise an addressable port that may be read by the data formatter 324.

For example, each of the signal lines extending between the buttons and the data interface 321 may be pulled up by individual pull up resistors (not shown). Depressing any of the individual buttons may ground the electrical signal line interconnecting the respective button and the data interface 321. Data formatter 324 may constantly read from the port defined by data interface 321, and all bit positions should remain high at any given time, if no buttons are depressed. If, however, the data formatter 324 reads a zero in one or more of the bit positions, it then recognizes that one or more of the buttons 327 and 329 have been depressed.

Each transmitter unit may be configured to have a unique identification code (e.g., transmitter identification number) 326, that uniquely identifies the transmitter to the functional blocks of control system 200 (see FIG. 2). This transmitter identification number may be electrically programmable, and implemented in the form of, for example, an EPROM. Alternatively, the transmitter identification number may be set/configured through a series of DIP switches. Additional implementations of the transmitter identification number, whereby the number may be set/configured, may be implemented consistent with the broad concepts of the present invention.

Finally, an additional functional block of the transmitter 320 is a RF transmitter 328. This circuit is used to convert information from digital electronic form into a format, frequency, and voltage level suitable for transmission from antenna 323 via an RF transmission medium.

The data formatter 324 operates to format concise data packets 330 that may be transmitted via RF to a nearby transceiver. From a substantive basis, the information conveyed includes a function code, as well as, a transmitter identification number. As previously mentioned, the transmitter identification number is set for a given transmitter 320. When received by server 260 (see FIG. 2), the transmitter identification number may be used to access a look up table that identifies, for example, the person assigned to carry that particular transmitter. Additional information about the person may also be provided within the lookup table, such as, a physical description, and/or any other information that may be deemed appropriate or useful under the circumstances or implementation of the particular system.

In addition, a function code is communicated from RF transmitter 320 to the nearby transceiver. FIG. 3A illustrates a lookup table 325 that may be provided in connection with data formatter 324. Lookup table 325 may be provided to assign a given and unique function code for each button pressed. For example, transmit button 327 may be assigned a first code to identify the party depressing the button. The emergency button 329 may be assigned a second code. Furthermore, additional codes may be provided as necessary to accommodate additional functions or features of a given transmitter 320. Thus, in operation, a user may depress the emergency button 329, which is detected by the data formatter 324. The data formatter 324 may then use the information pertaining to the emergency button 329 to access a look up table 325 to retrieve a code that is uniquely assigned to emergency button 329. The data formatter 324 may also retrieve the pre-configured transmitter identification number 326 in configuring a data packet 330 for communication via RF signals to a nearby transceiver.

Figure 3B:
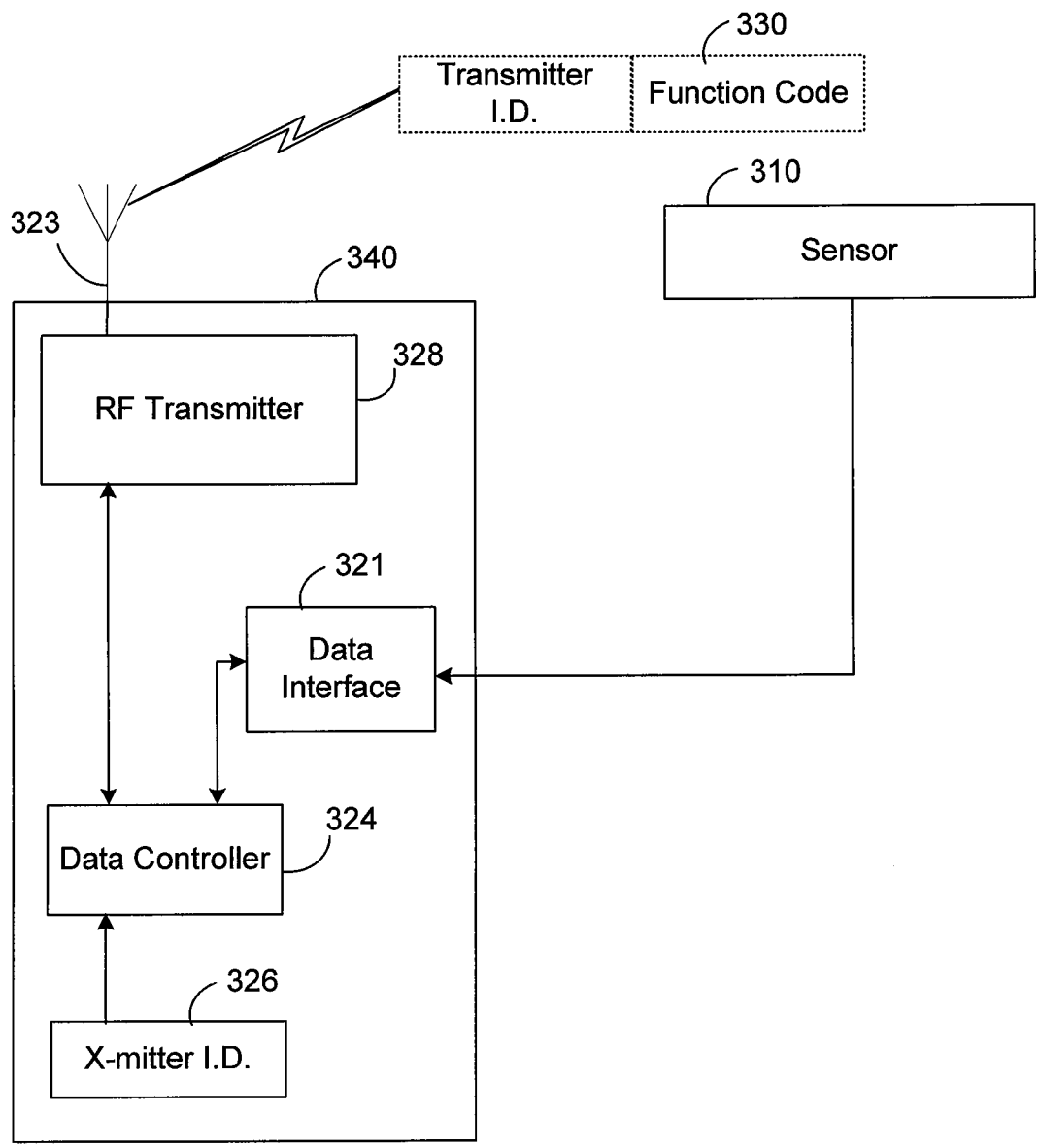
FIG. 3B is a functional block diagram that illustrates the integration of a sensor with a transmitter in accordance with the invention.

Reference is now made briefly to FIG. 3B, which is a block diagram illustrating certain functional blocks of a similar transmitter 340 that may be integrated with sensor 310. For example, sensor 310 in its simplest form could be a two-state device such as a smoke alarm. Alternatively, the sensor 310 may output a continuous range of values to the data interface 321. If the signal output from the sensor 310 is an analog signal, the data interface 321 may include an analog-to-digital converter (not shown) to convert signals output to the actuator 340. Alternatively, a digital interface (communicating digital signals) may exist between the data interface 321 and each sensor 310.

As illustrated, many of the components of RF transmitter 340 are similar to that of RF transmitter 320 and need not be repeated herein. The principal difference between the configurations of RF transmitter 320 of FIG. 3A and the RF transmitter 340 of FIG. 3B lies at the input of the data interface 321. Specifically, RF transmitter 320 included user interface buttons 327 and 329. RF transmitter 340, illustrates electrical integration with sensor 310. Unique transmitter identification code 326 coupled with a function code for a smoke alarm on condition is formatted by data controller 324 for transformation into a RF signal by RF transmitter 328 and transmission via antenna 323. In this way, data packet 330 communicated from transmitter 340 will readily distinguish from similar signals generated by other RF transmitters in the system. Of course, additional and/or alternative configurations may also be provided by a similarly configured RF transmitter. For example, a similar configuration may be provided for a transmitter that is integrated into, for example, a carbon monoxide detector, a door position sensor and the like. Alternatively, system parameters that vary across a range of values may be transmitted by RF transmitter 340 as long as data interface 321 and data controller 324 are configured to apply a specific code, consistent with the input from sensor 310. As long as the code was understood by server 260 or workstation 250 (see FIG. 2) the target parameter could be monitored with the present invention.

Figure 3C:
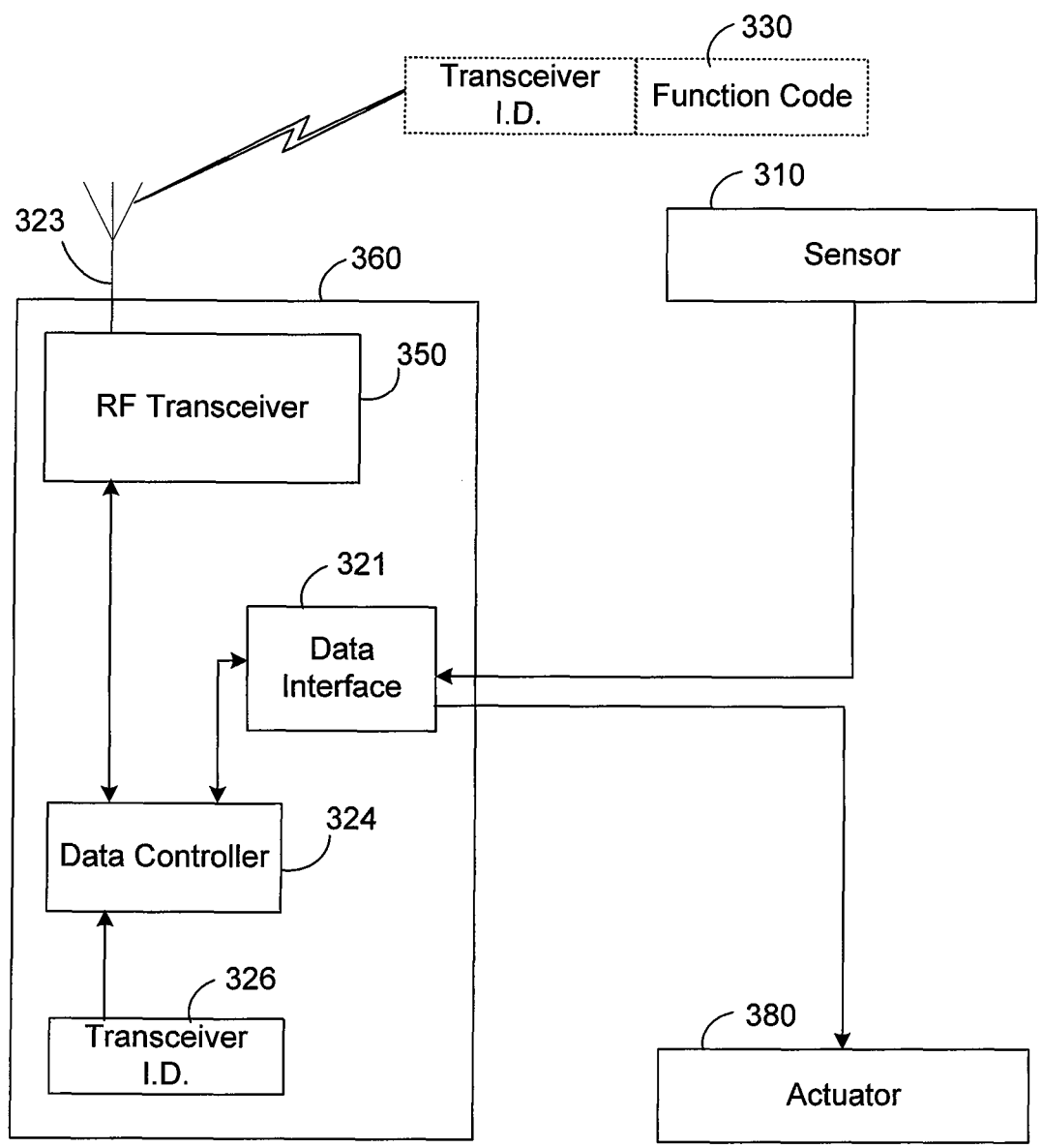
FIG. 3C is a block diagram illustrating a transceiver in accordance with the present invention integrated with a sensor and an actuator.

Reference is now made to FIG. 3C, which is a block diagram similar to that illustrated in FIGS. 3A and 3B, but illustrating a transceiver 360 that is integrated with a sensor 310 and an actuator 380. In this illustration, data interface 321 is shown with a single input from sensor 310. It is easy to envision a system that may include multiple sensor inputs. By way of example, a common home heating and cooling system might be integrated with the present invention. The home heating system may include multiple data interface inputs from multiple sensors. A home thermostat control connected with the home heating system could be integrated with a sensor that reports the position of a manually adjusted temperature control (i.e., temperature set value), as well as, a sensor integrated with a thermister to report an ambient temperature. The condition of related parameters can be input to data interface 321 as well, including the condition of the system on/off switch, and the climate control mode selected (i.e., heat, fan, or AC). In addition, depending upon the specific implementation, other system parameters may be provided to data interface 321 as well.

The addition of actuator 380 to the assembly permits data interface 321 to apply control signals to the manual temperature control for the temperature set point, the climate control mode switch, and the system on/off switch. In this way, a remote workstation 250 or laptop 240 with WAN access (see FIG. 2) could control a home heating system from a remote location.

Again, each of these various input sources are routed to data interface 321 which provides the information to a data controller 324. The data controller may utilize a look up table to access unique function codes that are communicated in data packet 330, along with a transceiver identification code 326 via RF, to a local gateway and further onto a WAN. In general, the operation of transceiver 360 will be similar to that described for a transmitter as previously illustrated in FIGS. 3A and 3B. It is significant to note that data packet 330 will include a concatenation of the individual function codes selected for each of the aforementioned input parameters. As by way of example, server 260 may provide client workstation 250 with a Web page display that models a common home thermostat. As previously described, either server 260 or workstation 250 may include application software that would permit a user with access to remotely adjust the controls on a home heating system by adjusting related functional controls on a graphical user interface updated with feedback from the aforementioned control system.

Figure 3D:
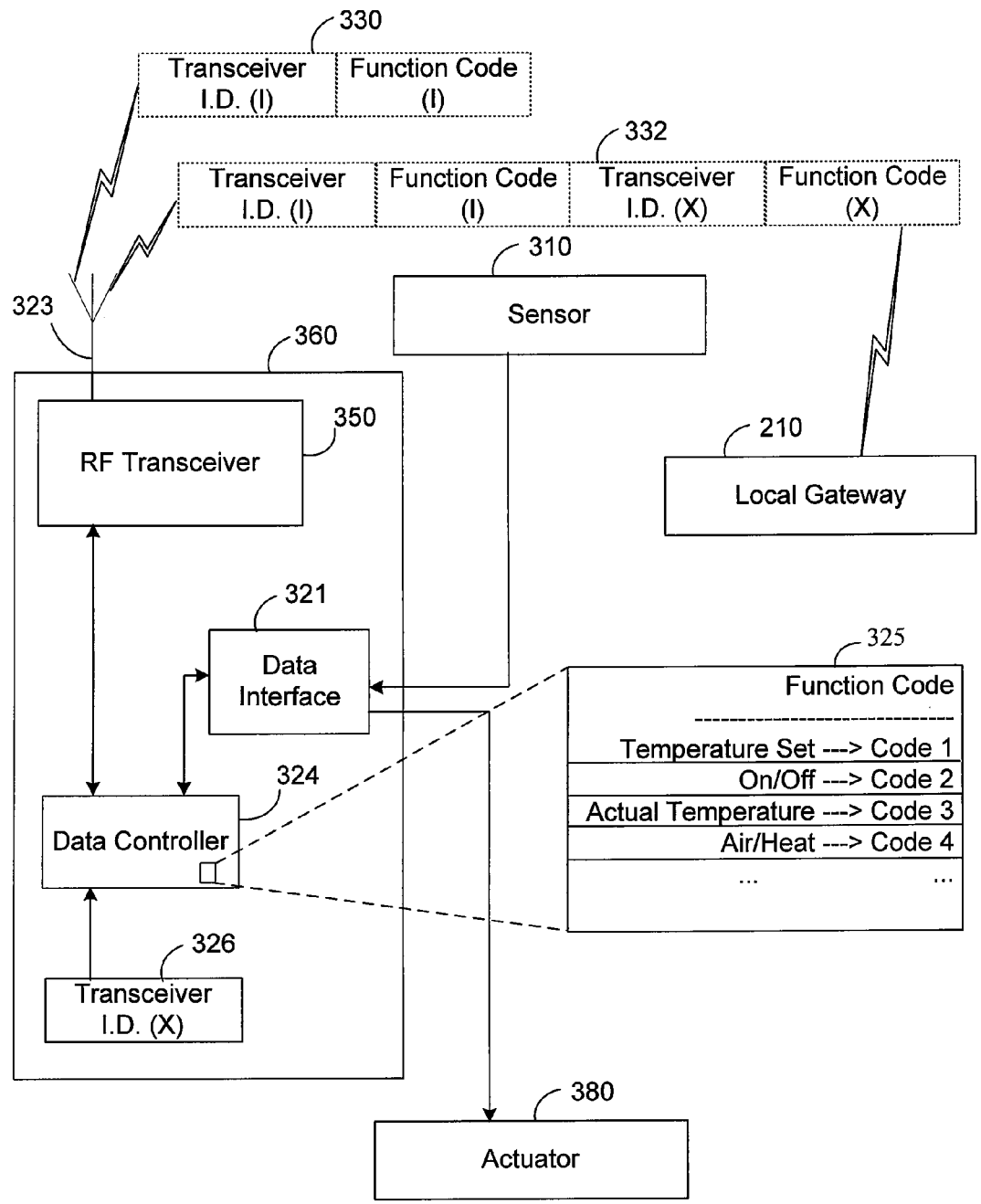
FIG. 3D is a functional block diagram further illustrating the transceiver of FIG. 3C as applied to a heating, ventilation, and air conditioning system controller.

Reference is now made to FIG. 3D, which is a block diagram further illustrating the transceiver of FIG. 3C in light of the home heating system described above. Specifically, transceiver 360 is shown with four specific parameters related to four specific function codes as illustrated in look up table 325. In this regard, sensor(s) 310 (one sensor shown for simplicity) inputs a data signal to data interface 321. Data controller receives an input from data interface 321 that it associates with a specific function code as shown in look up table 325. Data controller 324 assembles data packet 332 by concatenating received data packet 330 with its own transceiver identification code 326 and its own specific function codes. Data packet 332 is configured by RF transceiver 350 for transmission via antenna 323 to either a stand-alone transceiver as shown in FIG. 2, or alternatively, to local gateway 210. It will be appreciated by persons skilled in the art that data interface 321 may be uniquely configured to interface with specialized sensor(s) 310. This circuit, therefore, may differ from transceiver to transceiver, depending upon the remote system parameter that is monitored and the related actuator to be controlled. Implementation of data interface 321 will be understood by persons skilled in the art, and need not be described herein.

Figure 3E:
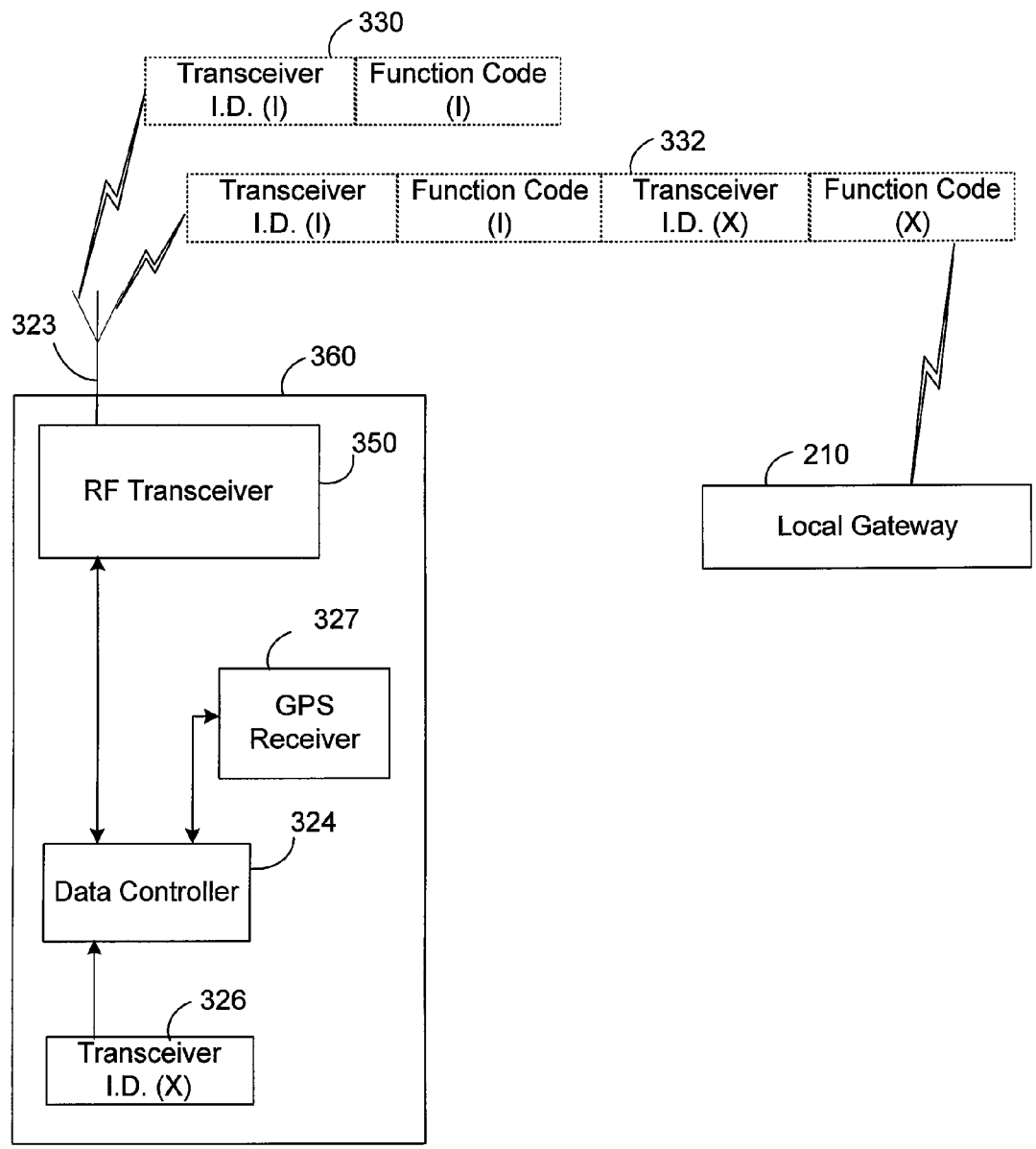
FIG. 3E is a functional block diagram illustrating the combination of the transceiver of FIG. 3D with a global positioning system (GPS) receiver.

Reference is now made to FIG. 3E, which is a block diagram further illustrating the transceiver of FIG. 3C in combination with a GPS receiver. Specifically, GPS receiver 327 replaces data interface 321, sensor 310, and actuator 380 as illustrated in FIG. 3C. In this regard, GPS receiver 327 inputs a data signal containing latitude and longitude coordinates to data controller 324. Data controller 324 assembles data packet 332 by concatenating received data packet 330 with its own transceiver identification code 326 and the coordinates received from GPS receiver 327. Data packet 332 is configured by RF transceiver 350 for transmission via antenna 323 to either a stand-alone transceiver as shown in FIG. 2, or alternatively, to local gateway 210 as previously described.

Figure 4:
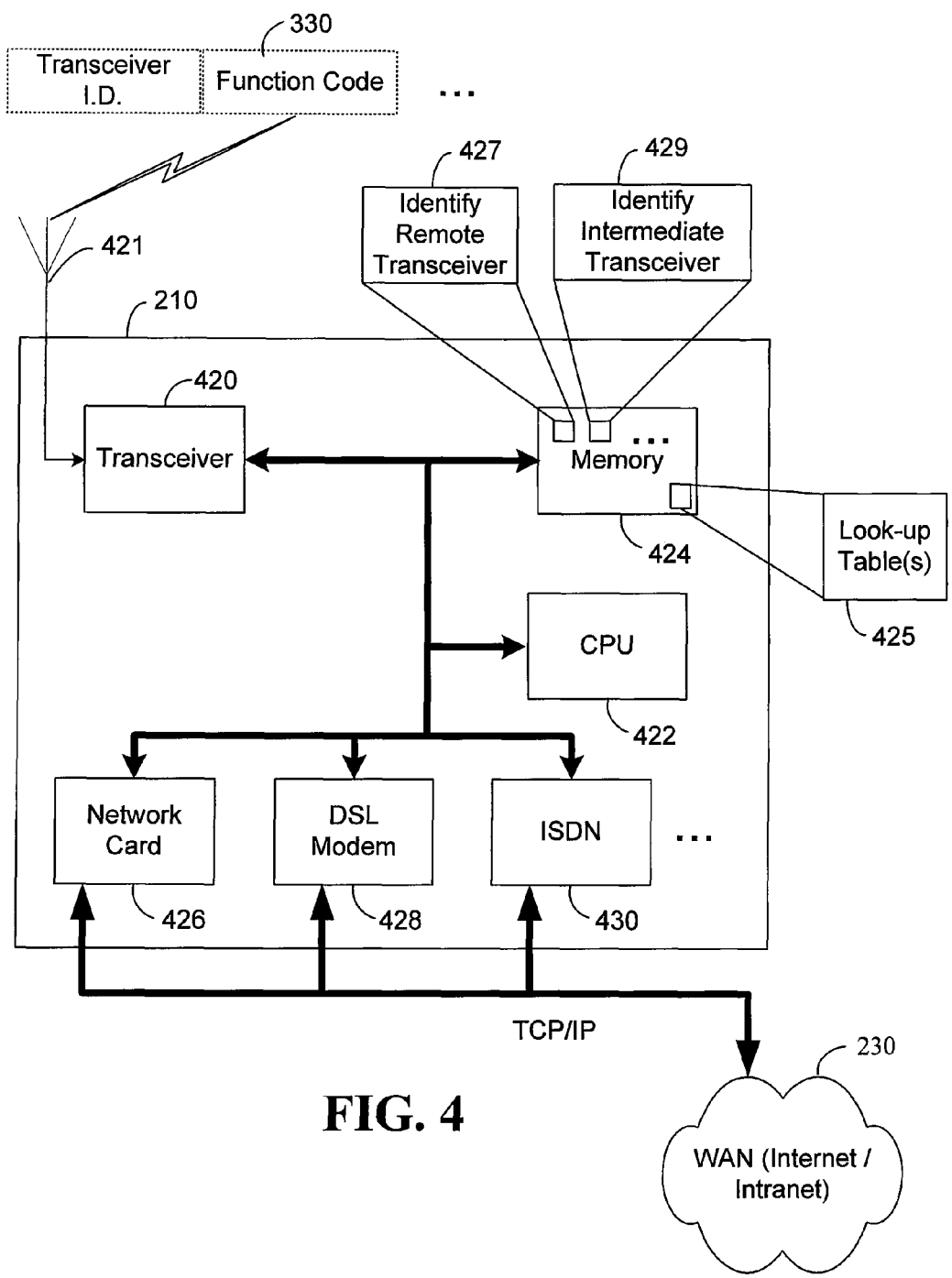
FIG. 4 is a functional block diagram that illustrates the functional components of a local WAN gateway constructed in accordance with the invention.

Having illustrated and described the operation of the various combinations of RF transmitters and transceivers consistent with the present invention, reference is now made to FIG. 4, which is a block diagram illustrating certain principal components and the operation of a local gateway 210 of a control system 100 (see FIG. 2) constructed in accordance with the present invention. The primary physical components that may be provided within local gateway 210 are a transceiver 420, a CPU 422, a memory 424, a network card 426, a DSL modem 428, an ISDN card 430, as well as other components not illustrated in the FIG. 4 that would enable a TCP/IP connection to WAN 230. The transceiver 420 is configured to receive incoming signals consistently formatted in the convention previously described. Local gateway 210 may be configured such that memory 424 includes look up table 425 to assist in identifying the remote and intermediate transceivers used in generating and transmitting the received data transmission. Program code within the memory 424 may also be provided and configured for controlling the operation of a CPU 422 to carry out the various functions that are orchestrated and/or controlled by local gateway 210. For example, memory 424 may include program code for controlling the operation of the CPU 422 to evaluate an incoming data packet to determine what action needs to be taken. In this regard, look up tables 425 may also be stored within memory 424 to assist in this process. Furthermore, memory 424 may be configured with program code configured to identify a remote transceiver 427 or identify an intermediate transceiver 429. Function codes, transmitter and or transceiver identification numbers, may all be stored with associated information within look up tables 425.

Thus, one look up table may be provided to associate transceiver identification numbers with a particular user. Another look up table may be used to associate function codes with the interpretation thereof. For example, a unique code may be associated by a look up table to identify functions such as test, temperature, smoke alarm active, security system breach, etc. In connection with the lookup tables 425, memory 424 may also include a plurality of code segments that are executed by CPU 422, and which largely control the operation of the computer. For example, a first data packet segment 330 may be provided to access a first lookup table to determine the identity of the transceiver which transmitted the received message. A second code segment may be provided to access a second lookup table to determine the proximate location of the message generating transceiver, by identifying the transceiver that relayed the message. A third code segment may be provided to identify the content of the message transmitted. Namely, is it a fire alarm, a security alarm, an emergency request by a person, a temperature control setting, etc. Consistent with the invention, additional, fewer, or different code segments may be provided to carryout different functional operations and data signal transfers throughout the transceiver network.

The local gateway 210 may also include one or more mechanisms through which to communicate with remote systems. For example, the gateway may include a network card 426, which would allow the gateway 210 to communicate across a local area network to a network server, which in turn may contain a backup gateway to WAN 230. Alternatively, local gateway 210 may contain a DSL modem 428, which may be configured to provide a direct dial link to a remote system, by way of the PSTN. Alternatively, local gateway 210 may include an ISDN card 430 configured to communicate via an ISDN connection with a remote system. Other communication gateways may be provided as well to serve as primary and or backup links to WAN 230 or to local area networks that might serve to permit local monitoring of gateway health and data packet control.

Figure 5:
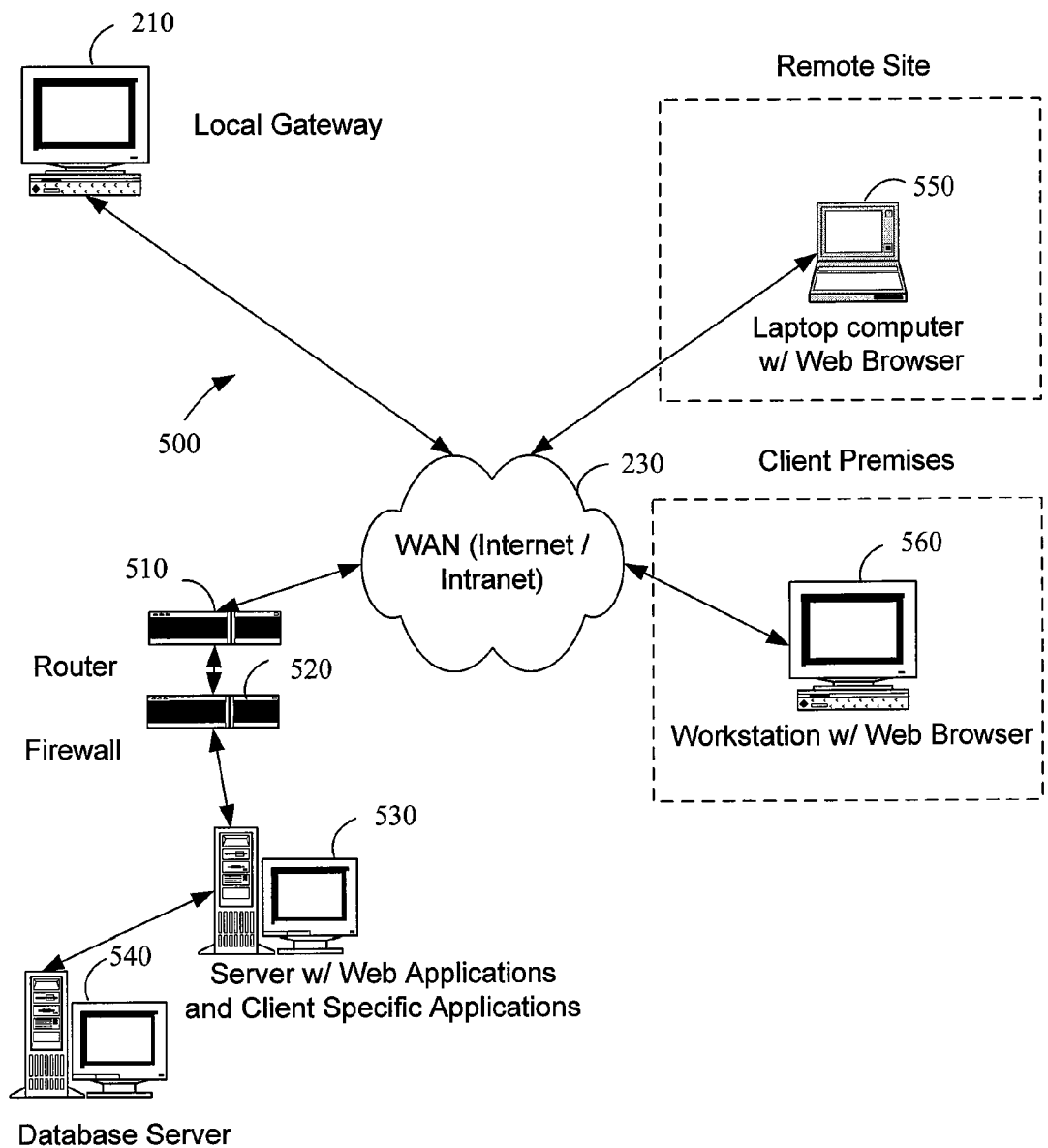
FIG. 5 is a diagram illustrating WAN connectivity in a system constructed in accordance with the invention.

Reference is now made to FIG. 5, which is a diagram illustrating WAN connectivity in a system constructed in accordance with the invention. In this regard, local gateway 210 is configured to transmit control signals and receive data signals using the open data packet protocol as previously described. Local gateway 210 is preferably interconnected permanently on WAN 230 and configured to translate received data signals for WAN transfer via TCP/IP. A server 530 configured with web applications and client specific applications as required is connected to WAN 230 via router 510 and further protected and buffered by firewall 520. Consistent with the present invention, server 530 is assisted in its task of storing and making available client specific data by database server 540. A workstation 560 configured with a Web browser is connected to WAN 230 at client premises by any suitable means known by those of skill in the art. Alternatively, clients may access WAN 230 via remote laptop 550 or other devices configured with a compatible Web browser. In this way, server 530 may provide client specific data upon demand.

Having described the control system of FIG. 2, reference is now made to FIG. 6 which illustrates a specific monitoring embodiment consistent with application of the invention. More specifically, FIG. 6 illustrates a remote utility meter monitoring system 600. Remote utility meter subsystem 610 consists of utility meter 613 and an appropriately integrated sensor 612 wherein the current utility meter operational status and current utility meter usage total is transmitted via functional codes along with a transceiver identification code in a manner previously described by transmitter 614 to stand-alone transceiver 221. Stand-alone transceiver 221 further processes and transmits the encoded data to local gateway 210 which translates the data packet information into TCP/IP format for transfer across WAN 230 to server 260. Server 260 collects and formats the utility meter information for viewing and or retrieval upon client demand in a manner previously described.

Having described a specific client application consistent with the present invention wherein the remote transmitter is permanently integrated with a stationary data input point (a utility meter), reference is now made to FIG. 7 which more fully illustrates the flexibility of the invention. More specifically, FIG. 7 illustrates a remote automotive diagnostics monitoring system 700. Remote automotive diagnostics interface unit 710 consists of sensor 712 integrated with the vehicle diagnostics data bus 711, and transmitter 714 wherein contents of the vehicle diagnostics can be downloaded upon a control signal to sensor 712 from a remote location serviced by local gateway 210. In this manner, a vehicle in need of service but still capable of accessing the vehicle diagnostics codes can be remotely diagnosed by uploading the information through remote automotive diagnostics monitoring system 700 and accessing a custom report created by server 260 in a manner previously described. In this regard, server 260 could be configured to perform any of a number of levels of diagnostics and provide service manual instructions, figures, and local authorized service contact information via WAN 230 on a fee basis or per a predetermined level of service plan.

Having described a monitoring system consistent with the present invention wherein the control signal initiates the monitoring process, reference is now made to FIG. 8. FIG. 8 illustrates a client specific control system consistent with both monitoring and control functions of the invention. More specifically, FIG. 8 illustrates a remote irrigation control system 800. For simplicity, controlled area 810 is represented by a single rain gauge 813 and a single related spray head 817. It is easy to see that such a system could be modified and expanded to monitor and control any of a number of irrigation systems integrated with the present invention.

Controlled area 810 is configured with a rain gauge 813 integrated with sensor 811 wherein rainfall and applied water to the adjacent area is transmitted via functional codes by transmitter 812 along with a related transceiver identification code in a manner previously described to stand-alone transceiver 221. Stand-alone transceiver 221 further processes and transmits the encoded data to local gateway 210 which translates the data packet information into TCP/IP format for transfer across WAN 230 to server 260. Server 260 collects and formats the rain gauge data for viewing or retrieval upon client demand in a manner previously described. Additionally, server 260 may be configured to communicate data to operate spray head 817 by opening water supply valve 816 integrated with actuator 814 by sending a control signal to transceiver 815, per a client directed water application control schedule. Alternatively, a customer workstation 250 could periodically download and review the rain gauge data and could initiate an automatic control signal appropriate with the customer's watering requirements. In yet another embodiment, a customer technician could initiate a control signal upon review of the rain gauge information and making the determination that more water is required.

Reference is now made to FIG. 9 which illustrates the operation of an automated parking control system 900 consistent with the present invention. Automated parking facility 910 consists of a controlled access area with ingress gate 920 and egress gate 930. Both gates 920 and 930 are further configured with a position sensor, an actuator, and transceiver illustrated as ingress assembly 922 and egress assembly 932, respectively. Parking spaces 940 may be configured with vehicle sensors. Sensor-transceiver assembly 932 may be configured to transmit a function code associated with the condition of parking spaces 1, 2, 3, and 4. It will be appreciated by those skilled in the art that the single row of four appropriately configured parking spaces illustrated can be expanded by adding parking spaces configured with vehicle sensors integrated with control system 900 via multiple sensor-transceiver assemblies. Automated parking control system 900 collects data signals from each sensor-transceiver assembly 932, integrated in the system, and compiles a master schedule consisting of scheduled use for each parking space in the automated parking facility. In this manner, a customer with access to WAN 230 and server 530 may make a reservation and or check the availability of parking spaces at the automated parking facility from her home or office (or through any Internet portal). For example, a customer that will be out of town on business for 2 days next week, may access the automated parking control system server 530 by using a Web browser to view parking availability for the target travel dates. The customer may reserve the parking slot by providing a personal transmitter identification code (or other identification code) that the customer intends to use to access and exit the facility the following week. When the customer arrives at the ingress gate 920, the customer may enter the automated parking facility 910 by depressing a button on her personal portable transmitter (see FIG. 3A). Ingress assembly 922 receives and forwards the customer's transmitted identification code to server 530 via gateway 210 and WAN 230 in a manner previously described. Server 530 confirms the customer's reservation, alternatively checks space availability to determine if access should be granted. In addition, server 530 may be further programmed to determine if the particular customer has an established account with the facility owner or whether a credit card payment transaction is in order. Automatic parking facility control system 900 would record the actual use of the reserved parking space for storage on database server 540. Server 530 could retrieve the stored usage information on a periodic basis from database server 540 and generate appropriate bills for each customer.

Alternatively, the customer could reserve the slot by providing billing information via WAN 230 and ingress gate 920 could be further configured with a credit card reader and an alphanumeric keypad interface. Both the credit card reader and the alphanumeric keypad interface could be interconnected to the automated parking facility control system 900 by their own appropriately configured transceiver. Either or both the credit card reader and the alphanumeric keypad interface could be used to identify customers with reservations.

The operator of parking facility control system 900, can expand both the level of security of the parking facility and the services provided by adding networked peripherals in a manner previously described and upgrading the software applications on server 530. For example, by adding automated ingress and egress gates configured to allow the entry and exit of parking facility customers and authorized personnel and configuring the egress gate 930 for vehicles such that only identified customers may exit with a vehicle, both customers and their vehicles are protected from thieves.

A further example of expanding the services offered by automated parking facility control system 900 might consist of offering a schedule of vehicle services that could be scheduled and performed on the vehicles of long-term parking customers. By adding the appropriate interface to server 530, parking facility customers could be prompted when making their reservation with a list of potential vehicle services that could be scheduled and performed by vehicle service technicians during the duration of the customer's business trip. A customer interested in having her automobile's oil changed and tires rotated would authorize and schedule the desired services when arranging her parking reservation. Upon leaving the parking facility at the start of her business trip, the customer could leave her vehicle valet key in an appropriately identified lock box. After her trip is complete, the customer returns to the lot. She gains access to the lot by any of the aforementioned methods and retrieves her valet key by similarly identifying herself as the vehicle owner.

Figure 10:
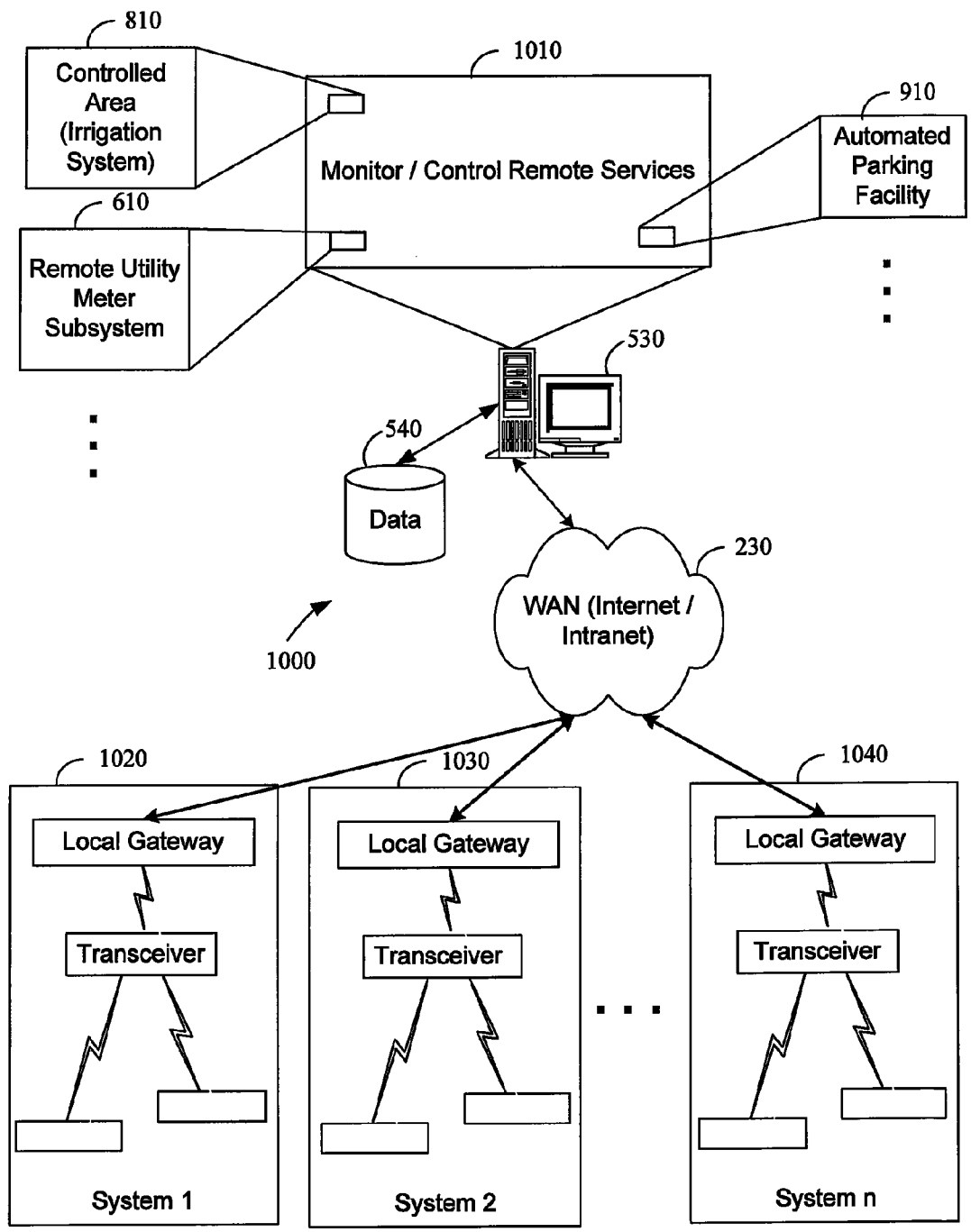
FIG. 10 is a block diagram further illustrating the present invention as deployed in a plurality of business applications.

Having illustrated specific applications using the present invention in FIGS. 6 through 9, reference is now made to FIG. 10 which illustrates a system 1000 that monitors and controls remote data points associated with a plurality of systems. In this embodiment, server 530 may be configured with monitor/control remote services 1010 application-specific software.

For example, the controlled area 810 of the irrigation control system shown in FIG. 8, the remote utility meter subsystem 610 of FIG. 6, and the automated parking facility 910 of FIG. 9 may be monitored and remotely controlled (where required) by server 530. In a manner previously described herein, server 530 collects and processes data information transferred and sent over WAN 230 by local gateways coupled via RF links to transceivers and transmitters associated with systems 1020, 1030, and 1040. Alternatively, server 530 initiates control signals that may be sent via the gateways to the appropriate transceivers and transmitters as required. For ease of illustration and description, FIG. 10 shows each of the systems serviced by server 530 requiring its own dedicated local gateway. It will be appreciated by those skilled in the art that small-scale systems jointly located within a geographic area served by an array of transceivers and a gateway may be configured to share the transceiver and gateway infrastructure of a previously installed local system.

Having described the physical layer of a system consistent with the present invention, reference is now made to FIG. 11 which describes the data structure of messages sent and received using the invention. In this regard, the standard message consists of: to address; from address; packet number; maximum packet number, packet length; command; data; packet check sum (high byte); and packet check sum (low byte). The "to address" or message destination consists from 1 to 6 bytes. The "from address" or message source device is coded in a full 6 byte designator. Bytes 11 through 13 are used by the system to concatenate messages of packet lengths greater than 256 bytes. Byte 14 is a command byte. Byte 14 works in conjunction with bytes 15 through 30 to communicate information as required by system specific commands. Bytes 31 and 32 are packet check sum bytes. The packet check sum bytes are used by the system to indicate when system messages are received with errors. It is significant to note that bytes 31 and 32 may be shifted in the message to replace bytes 15 and 16 for commands that require only one byte. The order of appearance of specific information within the message protocol of FIG. 11 remains fixed although the byte position number in individual message transmissions may vary due to scalability of the "to address," the command byte, and scalability of the data frame.

Having described the general message structure of a message of the present invention, reference is directed to FIG. 12 which illustrates three sample messages. The first message illustrates the broadcast of an emergency message "FF" from a central server with an address "0012345678" to a personal transceiver with an address of "FF."

The second message illustrated reveals how the first message might be sent to a transceiver that functions as a repeater. In this manner, emergency message "FF" from a central server with address "0012345678" is first sent to transceiver "F0." The second message, further contains additional command data "A000123456" that may be used by the system to identify further transceivers to send the signal through on the way to the destination device.

The third message illustrated on FIG. 12 reveals how the message protocol of the present invention may be used to "ping" a remote transceiver in order to determine transceiver health. In this manner, source unit "E112345678" originates a ping request by sending command "08" to a transceiver identified as "A012345678." The response to the ping request can be as simple as reversing the "to address" and the "from address" of the command, such that, a healthy transceiver will send a ping message back to the originating device. The system of the present invention may be configured to expect a return ping within a specific time period. Operators of the present invention could use the delay between the ping request and the ping response to model system loads and to determine if specific system parameters might be adequately monitored and controlled with the expected feedback transmission delay of the system.

Figure 13:
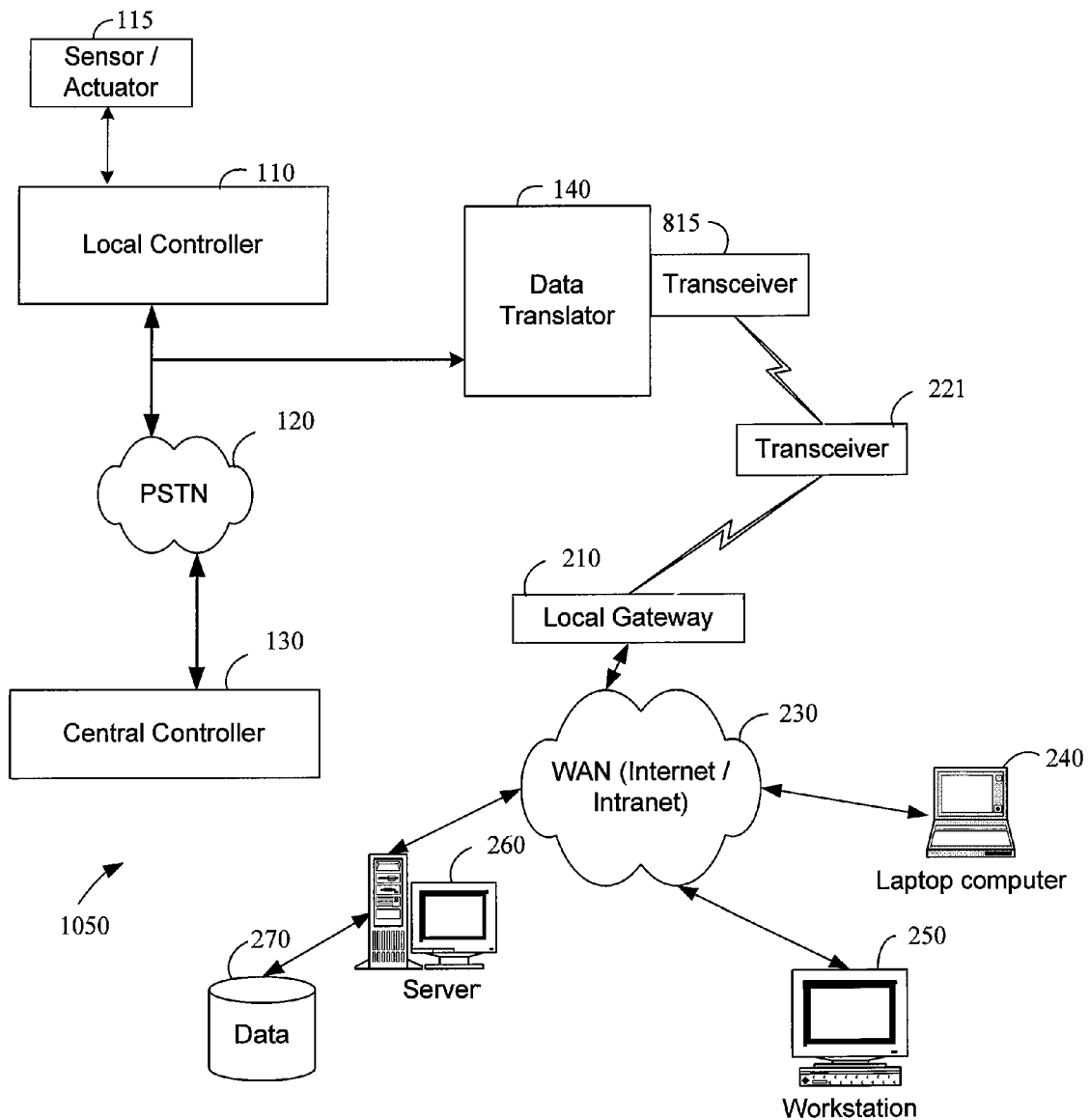
FIG. 13 is a block diagram illustrating the system of the present invention integrated with the local controller of FIG. 1.

Having described the message structure of a message of the present invention, reference is directed to FIG. 13 which illustrates the integration of the system of the present invention with the control system of FIG. 1. Having previously illustrated several variations consistent with the principles of the present invention, it will be appreciated by those skilled in the art that multiple variations of the present invention may be integrated with existing control systems. In this regard, an existing control system with local controller 110 and a plurality of sensor actuators 115 (one shown for simplicity of illustration) are in communication with central controller 130 via PSTN 120 as previously described. In a manner well known in the art of control systems, local controller 110 transmits appropriate status information via PSTN 120 to central controller 130.

Control systems consistent with the design of FIG. 1, as further illustrated in FIG. 13, require the routing of electrical conductors to each sensor and actuator as the application requires. It will be appreciated by those skilled in the art that the system of the present invention can take advantage of the infrastructure of an existing system by inserting data translator 140 such that system data is sent to both the central controller 130 in the old configuration, as well as, the data translator 140. Data translator 140 serves to convert system data to function codes as previously described. Once data translator 140 successfully converts the system data stream to the message protocol of the present invention, transceiver 815 further converts the system data stream to a RF signal.

As previously described in connection with FIG. 2, stand-alone transceiver 221 receives and repeats the RF data transmission received from transceiver 815. Local gateway 210 receives the RF data transmission repeated by stand-alone transceiver 221 and converts the RF data transmission into TCP/IP for further transmission across WAN 230 to server 260. In this regard, server 260 may further manage the data for internal storage or alternatively storage in database 270. Customers with WAN 230 access may access the system data from workstation 250 or laptop computer 240.

Figure 14:
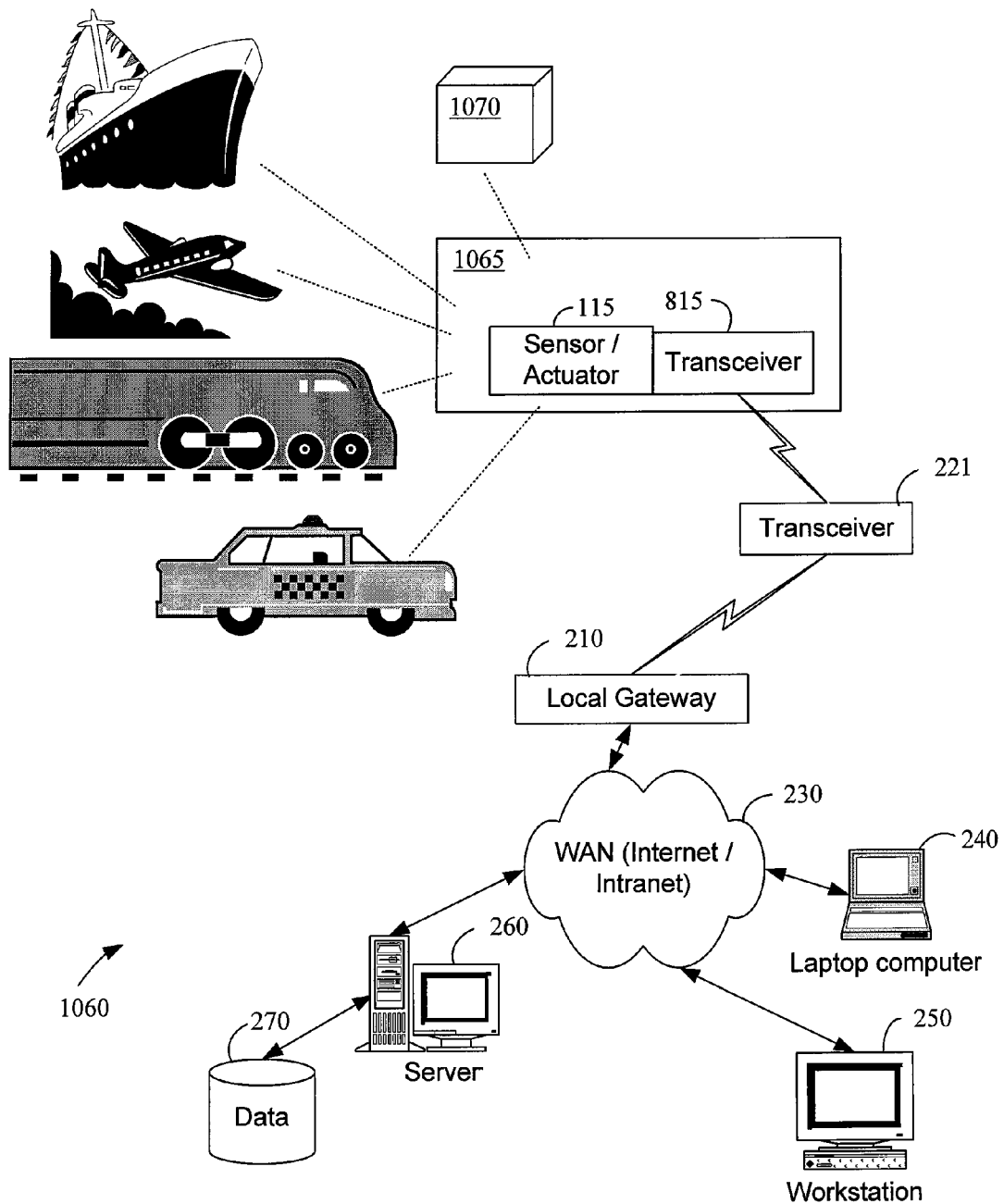
FIG. 14 is a block diagram illustrating the system of the present invention integrated with a mobile inventory unit.

Having described integration of the system of the present invention with the control system of FIG. 1 in FIG. 13, reference is now directed to FIG. 14 which illustrates integration of the system of the present invention with mobile inventory units. In this regard, system 1060 consists of the system of the present invention as previously illustrated and described in FIGS. 1 and 13. Having previously illustrated several variations consistent with the principles of the present invention, it will be appreciated by those skilled in the art that multiple variations of the present invention may be integrated with mobile inventory units 1070. In this regard, sensor/actuator 115 integrated with transceiver 815 in sensor-transceiver assembly 1065 is further integrated with any of a number of mobile inventory units 1070 (one sensor-transceiver unit 1065 shown for simplicity of illustration). It will be appreciated by those skilled in the art that as long as a mobile inventory unit 1070, herein represented by a package, ship, airplane, train, and a taxi are within the radio-frequency transmission and receiving range of stand-alone transceiver 221, the system of the present invention may be used to monitor, store and report information of and relating to mobile inventory unit 1070.

It will be further appreciated by those skilled in the art that the system of the present invention may be used to transfer information to adequately equipped mobile inventory units 1070. In this regard, shipping companies may use the present invention to update a database containing location and status information for each mobile inventory unit 1070 in the company fleet. Shipping companies may also transfer informative messages or other information using the system of the present invention.

In one embodiment, the present invention may be used to store, retrieve, and update maintenance information related to individual mobile inventory units. For example, federally registered airplanes must keep a maintenance log with the craft detailing all inspections, maintenance, and repairs. The system of the present invention could be used by fixed base operators (FBOs) who perform inspections and maintenance on aircraft to retrieve and update the aircraft maintenance log. In this way, FBOs located throughout the world will be able to retrieve and update an electronic version of the maintenance history of an aircraft. In addition, a properly configured system could also contain maintenance directives and other service bulletins related to the particular aircraft.

In yet another embodiment, a properly integrated sensor/actuator 115 with transceiver 815 may be used to monitor mobile inventory unit system parameters. For example, an airplane could be configured to monitor and report engine run time, time elapsed since the last recorded inspection of a particular type, and related system information. It will be appreciated by those skilled in the art that the system of the present invention may be integrated with remote units other than those shown. The ship, package, airplane, train, and taxi shown in FIG. 14 are for example only and not meant to limit the scope of the present invention.

It will be appreciated that the foregoing description has illustrated certain fundamental concepts of the invention, but that other additions and/or modifications may be made consistent with the inventive concepts. For example, the one-way transmitters illustrated in FIG. 3A and implemented in a control system as illustrated in FIG. 6 may be adapted to monitor the current status of water, gas, and other utility meters. One-way transmitters might further be used to monitor and report actual operational hours on rental equipment or any other apparatus that must be serviced or monitored on an actual run-time schedule.

The two-way transceivers of the current invention, may be adapted to monitor and apply control signals in an unlimited number of applications. By way of example only, two-way transceivers of the current invention can be adapted for use with pay type publicly located telephones, cable television set converter boxes, as well as, for use with a host of residential appliances and devices to enable a remote controllable home automation and security system.

In a geographic area appropriately networked with permanently located transceivers consistent with the invention, personal transmitters consistent with the invention can be used to monitor and control personnel access and egress from specific rooms or portions thereof within a controlled facility. Personal transmitters can further be configured to transfer personal information to public emergency response personnel, personal billing information to vending machines, or to monitor individuals within an assisted living community.

Two-way transceivers consistent with the present invention can be integrated to monitor and control a host of industrial and business applications as well. By way of example only, building automation systems, fire control systems, alarm systems, industrial trash compactors, and building elevators can be monitored and controlled with devices consistent with the present invention. In addition, courier drop boxes, time clock systems, automated teller machines, self-service copy machines, and other self-service devices can be monitored and controlled as appropriate. By way of further example, a number of environment variables that require monitoring can be integrated with the system of the present invention to permit remote monitoring and control. For instance, light levels in the area adjacent to automated teller machines must meet minimum federal standards, the water volume transferred by water treatment plant pumps, smokestack emissions from a coal burning power plant or a coke fueled steel plant oven may also be remotely monitored.

The two-way transceivers of the present invention may be further integrated with a voice-band transmitter and receiver. As a result, when a person presses, for example, the emergency button on his/her transmitter, medical personnel, staff members, or others may respond by communicating via two-way radio with the party in distress. In this regard, each transmitter may be equipped with a microphone and a speaker that would allow the person to communication information such as their present emergency situation, their specific location, etc.

The foregoing description has been presented for purposes of illustration and description. It is not intended to be exhaustive or to limit the invention to the precise forms disclosed. Obvious modifications or variations are possible in light of the above teachings. For example, it should be appreciated that, in some implementations, the transceiver identification number is not necessary to identify the location of the transmitter. Indeed, in implementations where the transmitter is permanently integrated into an alarm sensor other stationary device within a system, then the control system server and or local gateway could be configured to identify the transmitter location by the transmitter identification number alone. In will be appreciated that, in embodiments that do not utilize repeating transceivers, the transmitters will be configured to transmit at a higher RF power level, in order to effectively communicate with the control system local gateway.

The embodiment or embodiments discussed were chosen and described illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

We claim:

1. A remote irrigation control system, comprising:
a rain sensor enabled to detect the amount of rain received in a first rain area; and
a first local transceiver in communication with the rain sensor, the first local transceiver configured to receive information from the rain sensor and transmit the information to a gateway, the first local transceiver also configured to receive information from the gateway,
wherein the gateway is connected to a wide area network and configured to receive information from the first local transceiver and transmit the information to the wide area network, the gateway also configured to receive information from the wide area network and transmit the information to the first local transceiver.

2. The remote irrigation control system in claim 1, further comprising a water control assembly in communication with a second local transceiver, the water control assembly including at least one water supply valve, at least one actuator and at least one water spray head.

3. The remote irrigation control system in claim 2, wherein the second local transceiver is enabled to receive a first control signal from the gateway and communicate the first control signal to the water control assembly.

4. The remote irrigation control system in claim 3, wherein the first control signal instructs the water control assembly to activate the at least one actuator to open the at least one water supply valve and activate the at least one water spray head.

5. The remote irrigation control system in claim 4, further comprising a server connected to the wide area network configured to receive information from the first local transceiver and transmit the information to the gateway.

6. The remote irrigation control system in claim 5, wherein the server is configured to receive information from the first rain sensor regarding the amount of rain received in a first rain area.

7. The remote irrigation control system in claim 6, wherein the server is configured to transmit a second control signal to the second local transceiver regarding control of the water control assembly.

8. The remote irrigation control system in claim 6, wherein the rain sensor is enabled to detect the amount of water applied by the water control assembly in a first rain area.

9. The remote irrigation control system in claim 8, server is configured to receive information from the first rain sensor regarding the amount of water applied by the water control assembly in a first rain area.

10. The remote irrigation control system in claim 6, server is configured to transmit a third control signal to the second local transceiver, the third control signal instructs the water control assembly to deactivate the at least one actuator to close the at least one water supply valve.

11. A remote irrigation control system, comprising:
    a rain sensor enabled to detect the amount of rain received in a first rain area;
    a first local transceiver in communication with the rain sensor, the first local transceiver configured to receive information from the rain sensor and transmit the information to a gateway, the first local transceiver also configured to receive information from the gateway;
    wherein the gateway is connected to a wide area network and configured to receive information from the first local transceiver and transmit the information to the wide area network, the gateway also configured to receive information from the wide area network and transmit the information to the first local transceiver;
    a water control assembly in communication with the first local transceiver, the water control assembly including at least one water supply valve, at least one actuator and at least one water spray head; and
    wherein the first local transceiver is enabled to receive a first control signal from the gateway and communicate the first control signal to the water control assembly.

12. The remote irrigation control system in claim 11, the first control signal instructs the water control assembly to activate the at least one actuator to open the at least one water supply valve and activate the at least one water spray head.

13. The remote irrigation control system in claim 12, further comprising a server connected to the wide area network configured to receive information from the first local transceiver and transmit the information to the gateway.

14. The remote irrigation control system in claim 13, wherein the server is configured to receive information from the first rain sensor regarding the amount of rain received in a first rain area.

15. The remote irrigation control system in claim 14, wherein the server is configured to transmit a second control signal to the second local transceiver regarding control of the water control assembly.

16. The remote irrigation control system in claim 15, wherein the rain sensor is enabled to detect the amount of water applied by the water control assembly in a first rain area.

17. The remote irrigation control system in claim 16, server is configured to receive information from the first rain sensor regarding the amount of water applied by the water control assembly in a first rain area.

18. The remote irrigation control system in claim 17, server is configured to transmit a third control signal to the first local transceiver, the third control signal instructs the water control assembly to deactivate the at least one actuator to close the at least one water supply valve.

19. A remote irrigation control system, comprising:
    a rain sensor enabled to detect the amount of rain received in a first rain area;
    a first local transceiver in communication with the rain sensor, the first local transceiver configured to receive information from the rain sensor and transmit the information to a gateway, the first local transceiver also configured to receive information from the gateway;
    wherein the gateway is connected to a wide area network and configured to receive information from the first local transceiver and transmit the information to the wide area network, the gateway also configured to receive information from the wide area network and transmit the information to the first local transceiver; and
    a server connected to the wide area network configured to receive information from the first local transceiver and transmit the information to the gateway.

20. The remote irrigation control system in claim 19, wherein the server is configured to receive information from the first rain sensor regarding the amount of rain received in a first rain area.

* * * * *